(12) United States Patent
Kumari et al.

(10) Patent No.: US 12,471,123 B2
(45) Date of Patent: Nov. 11, 2025

(54) TECHNIQUES FOR ALLOCATING RESOURCES FOR COMMUNICATIONS AND RADAR SENSING

(71) Applicant: QUALCOMM Incorporated, San Diego, CA (US)

(72) Inventors: Preeti Kumari, San Diego, CA (US); Hong Cheng, Basking Ridge, NJ (US); Kapil Gulati, Belle Mead, NJ (US); Sony Akkarakaran, Poway, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1006 days.

(21) Appl. No.: 17/547,561

(22) Filed: Dec. 10, 2021

(65) Prior Publication Data

US 2023/0189306 A1    Jun. 15, 2023

(51) Int. Cl.
*H04W 28/02* (2009.01)
*H04L 5/00* (2006.01)
*H04W 72/51* (2023.01)

(52) U.S. Cl.
CPC ........... *H04W 72/51* (2023.01); *H04L 5/0007* (2013.01); *H04L 5/0064* (2013.01); *H04W 28/0257* (2013.01)

(58) Field of Classification Search
CPC .......................... H04W 72/51; H04W 28/0257
USPC .......................................................... 370/329
See application file for complete search history.

(56) References Cited

U.S. PATENT DOCUMENTS

2015/0156780 A1* 6/2015 Kim ...................... H04L 5/0035
370/329

FOREIGN PATENT DOCUMENTS

WO    WO-2017052869 A1 *  3/2017  ............. H04L 5/001

* cited by examiner

*Primary Examiner* — Angel T Brockman
(74) *Attorney, Agent, or Firm* — Holland & Hart LLP

(57) ABSTRACT

Methods, systems, and devices for wireless communications are described. A base station may identify a first radio bearer to be used for sensing operations and a second radio bearer to be used for data communications. The base station may transmit, to a user equipment (UE), a control message indicating the first radio bearer and the second radio bearer, where the first radio bearer and the second radio bearer may be indicative of a resource allocation for the sensing operations and the data communications. The UE may perform the sensing operations in accordance with a resource allocation, and perform the data communications in accordance with the resource allocation, where the resource allocation may be based on the first radio bearer and the second radio bearer. The UE may perform the sensing operations and the data communications in accordance with a joint communication and radar (JCR) system.

30 Claims, 16 Drawing Sheets

TECHNIQUES FOR ALLOCATING RESOURCES FOR COMMUNICATIONS AND RADAR SENSING

FIELD OF TECHNOLOGY

The following relates to wireless communications, including techniques for allocating resources for communications and radar sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device, such as a UE, may be configured to operate in accordance with a joint communication and radar (JCR) system, or some other joint communication and sensing system. In a JCR system, the UE may perform communications and sensing operations and in some cases, the UE may utilize the sensing operations to aid the communications, or vice versa. Techniques for allocating resources to the sensing operations and the communication operations in a JCR system may be improved.

SUMMARY

The described techniques relate to improved methods, systems, devices, and apparatuses that support techniques for allocating resources for communications and radar sensing. Generally, the described techniques provide for improved methods of allocating resources for sensing operations and communication operations by a user equipment (UE) in a joint communication and radar (JCR) system, or some other joint communication and sensing system. To effectively allocate resources to the different operations, one or more parameters associated with each operation may be compared, such as a priority. In some cases, the UE may be configured with a sensing radio bearer (SSRB) to perform the sensing operations and a data radio bearer (DRB) to perform the communications. In some cases, the comparison of the one or more parameters may be based on the SSRB and the DRB. Based on the comparison, the UE may be perform the sensing operations in a first set of resources of a resource allocation and may perform the communications in a second set of resources of a common resource in accordance with JCR. For example, a base station may identify a first radio bearer to be used for sensing operations and a second radio bearer to be used for data communications. The base station may transmit, to a UE, a control message indicating the first radio bearer and the second radio bearer, where the first radio bearer and the second radio bearer may be indicative of a resource allocation for the sensing operations and the data communications. The UE may perform the sensing operations in accordance with a resource allocation, and perform the data communications in accordance with the resource allocation, where the resource allocation may be based on the first radio bearer and the second radio bearer.

DETAILED DESCRIPTION

Figure 1:
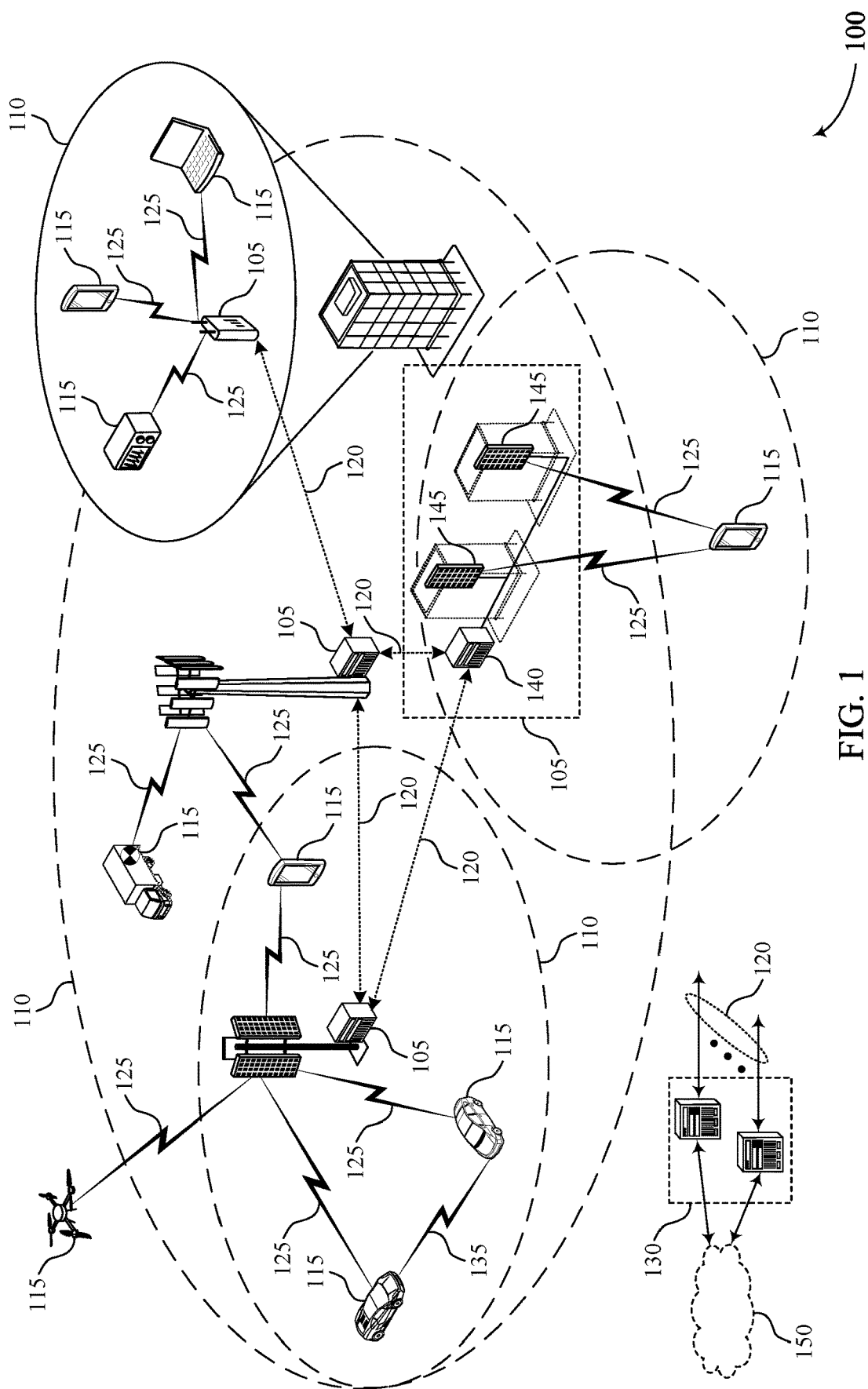
FIG. 1 illustrates an example of a wireless communications system that supports techniques for allocating resources for communications and radar sensing in accordance with aspects of the present disclosure.

Joint communication and radar (JCR) systems may be implemented by a device, such as a vehicle, to integrate sensing operations and communication operations. For example, a device, such as a user equipment (UE), may perform sensing operations (e.g., radar sensing, lidar sensing) to determine a position of the device, such as a distance from another object. The device may use the information determined by sensing, such as the position, to aid in communications. Additionally, communications may be used to aid sensing operations. In some cases, a device may be configured to implement JCR using a common spectrum resource, such as a single frequency band or multiple frequency bands. To utilize the same spectrum resource, a JCR device may implement time division multiplexing (TDM) to split the time resources between communication and radar operations. Accordingly, there may be a trade-off between communication performance and radar performance.

To improve resource allocation in JCR systems, the communication operations and the sensing operations may be prioritized or otherwise compared to determine an appropriate resource allocation for the two operations in a common spectrum. To compare the two operations, the respective radio bearers associated with each operation may be used. For example, the sensing operations may be associated with a sensing radio bearer (SSRB) and the communication operation may be associated with a communication radio bearer, such as a data radio bearer (DRB). Each radio bearer may be associated with a set of parameters. For example, the SSRB and DRB may each be associated with quality of service (QoS) parameters, such as a 5QI, a resource type, priority level, packet delay budget, etc. The QoS parameters of an SSRB and the QoS parameters of a communication DRB may be compared to determine a resource configuration of sensing operations and communication operations in a common spectrum. For example, the sensing operations may be associated with a higher priority than the communications operations and accordingly, the sensing operations may be scheduled first in the resource allocation and/or assigned more resources than the communication operations.

Particular aspects of the subject matter described herein may be implemented to realize one or more advantages. The described techniques may support improvements in allocating resources to sensing operations and communication operations in a JCR system. Accordingly, the described techniques may support improved reliability, improved utilization of resources, and decreased latency, among other advantages. As such, supported techniques may include improved network operations and, in some examples, may promote network efficiencies, among other benefits.

Aspects of the disclosure are initially described in the context of wireless communications systems. Aspects are then described with reference to a radio bearer configuration procedure and a process flow. Aspects of the disclosure are further illustrated by and described with reference to apparatus diagrams, system diagrams, and flowcharts that relate to techniques for allocating resources for communications and radar sensing.

FIG. 1 illustrates an example of a wireless communications system 100 that supports techniques for allocating resources for communications and radar sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a device, such as a UE 115, may be configured to operate in accordance with a JCR system. In such cases, a base station 105 may identify a first radio bearer to be used for sensing operations (e.g., an SSRB) and a second radio bearer to be used for data communications (e.g., DRB). The base station 105 may transmit, to a UE 115, a control message (e.g., a radio resource control (RRC) message) indicating the first radio bearer and the second radio bearer, where the first radio bearer and the second radio bearer may be indicative of a resource allocation for the sensing operations and the data communications. The UE 115 may perform the sensing operations in accordance with a resource allocation, and perform the data communications in accordance with the resource allocation, where the resource allocation may be based on the first radio bearer and the second radio bearer.

Figure 2:
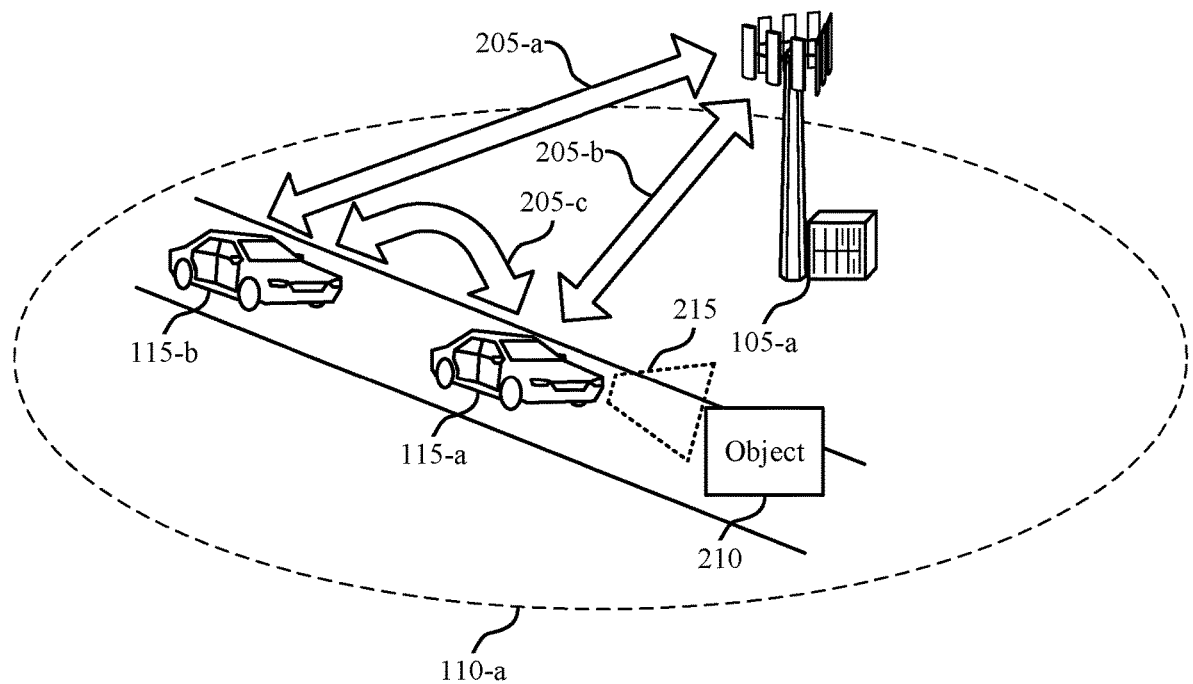
FIG. 2 illustrates an example of a wireless communications system that supports techniques for allocating resources for communications and radar sensing in accordance with aspects of the present disclosure.

FIG. 2 illustrates an example of a wireless communications system 200 that supports techniques for allocating resources for communications and radar sensing in accordance with aspects of the present disclosure. The wireless communications system 200 may include base station 105-*a* and UE 115-*a*, which may be examples of a base station 105 and a UE 115 as described with reference to FIG. 1. Base station 105-*a* may serve a geographic coverage area 110-*a*. In some cases, UE 115-*a* may implement a joint communication and sensing procedure in accordance with a determined resource allocation based on one or more parameters and/or radio bearers associated with respective communication operations and sensing operations. Additionally or alternatively, other wireless devices, such as a base station 105, or some other network device, may implement a same or similar procedure.

In some wireless communications systems (e.g., wireless communications system 200), a network device, such as a UE 115, may communicate with one or more other devices, such as another UE 115, or a base station 105. For example, UE 115-*a* may communicate with UE 115-*b* via communications link 205-*c* (e.g., a sidelink communications link) and communicate with base station 105-*a* via communications link 205-*b* (e.g., a downlink communications link, an uplink communications link). Similarly, UE 115-*b* may communicate with base station 105-*a* via communications link 205-*a* (e.g., a downlink communications link, an uplink communications link).

In some cases, the UE 115 may be configured to perform sensing operations, such as radar sensing, lidar sensing, sensing via cameras or sensors, etc., where the UE 115 may perform the sensing operations to perceive the environment around the UE 115 (e.g., environmental sensing and awareness). For example, UE 115-*b* (e.g., a vehicle UE 115) may perform radar sensing 215 and detect an object 210 near and/or in the path of UE 115-*a*. In some cases, the UE 115 may be configured to perform the sensing operations in accordance with joint communication and sensing operations (e.g., JCR). In accordance with joint communication and sensing, the sensing operations may be employed in a communication network, where the sensing operations and communication operations may be integrated. For example, UE 115-*a* may perform sensing operations to determine a position of UE 115-*a*, such as a distance from another object 210, or a UE 115 (e.g., UE 115-*b*) and UE 115-*a* may use the information determined by sensing, such as the position, to aid in communications (e.g., sidelink communications, uplink communications, downlink communications). For example, UE 115-*a* may determine that an object 210 is blocking one or more beams of UE 115-*a* and accordingly, UE 115-*a* may perform a beam management procedure to avoid the blockage. In another example, UE 115-*a* may determine that an object is in the path of one or more UEs 115, such as UE 115-*a* and UE 115-*b*, and may transmit a message to UE 115-*b*, or base station 105-*a*, or both including an indication of the object 210. In some cases, the UE 115 may utilize the communications to aid the sensing operations. For example, the UE 115 may determine where, when, and/or how to sense based on communications.

Joint communication and sensing may be categorized based on implementation. For example, joint communication and sensing may be implemented in a cooperative configuration or a co-design configuration. A cooperative configuration may include a device being configured with sensing-specific components (e.g., transmitters, receivers) and communication-specific components (e.g., transmitters, receivers). The sensing components and the communication components may then exchange information. For example, some knowledge may be shared between the communication and sensing systems to improve respective performances. In some cases, a cooperative design may be implemented without significant altering of the core operation of sensing and communication systems. Accordingly, benefits of a cooperative design may include spectrum reuse and ease of implementation. A co-design configuration may include a device being configured with a single set of components (e.g., transmitters, receivers) which may be used for both communication and sensing operations. In some cases, the co-design configuration may involve modification to transmit waveform generation and/or the receiver processing associated with communication and/or sensing operations. Benefits of a co-design configuration may include hardware and spectrum reuse.

In some cases, the UE 115 may be configured to implement joint communication and sensing using a common spectrum resource, such as a single frequency band (e.g., both communication and sensing operate at a 60 GHz band, for example) or multiple frequency bands (e.g., joint communication and sensing implemented at a 28 GHz and a 60 GHz band, for example). To utilize the same spectrum resource, a joint communication and sensing device may implement TDM to split the time resources between communication operations and sensing operations. Accordingly, there may be a trade-off between communication performance and radar performance based on the resource allocation. For example, a higher number of radar slots may lead to high resolution radar sensing with increased detection performance at the cost of low communication throughput. In another example, scheduling a radar slot first may lead to early radar target detection, while increasing latency for communications.

To determine an appropriate resource allocation for communication operations and sensing operations in a JCR system, a device (e.g., a UE 115, a base station 105) may prioritize communication and radar objectives to optimize time resource allocation and scheduling for a common spectrum resource. To prioritize communication and sensing operations, one or more parameters (e.g., key performance indicators (KPIs)) of a sensing operation may be compared to one or more parameters of a communication operation, such as priority, latency, etc. In some cases, the one or more parameters may be associated with (e.g., determined by) a radio bearer. Therefore, a radio bearer may be configured for a sensing operation (e.g., an SSRB) and a radio bearer may be configured for the communication operation (e.g., a DRB). Accordingly, a UE 115 may receive an indication, form a base station 105, of one or more SSRBs and one or more DRBs for performing to use for performing the sensing and communication operations.

The one or more parameters (e.g., KPIs) may thus be determined based on the respective radio bearers and may be compared to determine a resource allocation for the sensing operation and communication operation, as described in more detail with reference to FIG. 3. In some cases, a UE 115 may determine the resource allocation based on the radio bearers, or a base station 105 may determine the resource allocation based on the radio bearers and indicate the resource allocation to the UE 115 (e.g., via a control message such RRC).

In some implementations, KPIs (e.g., link-level KPIs, system-level KPIs, or a both) may be configured for joint communication and sensing (e.g., JCR), where the communication operations and the sensing operations may be configured with the same KPIs, or different KPIs. For example, KPIs for the sensing operations (e.g., radar, such as in full-duplex) may include range, angle, and velocity resolution, a maximum and/or minimum range, velocity, and angle (FoV), a probability of misdetection and false alarm, a maximum number of targets detected, interference KPIs (e.g., SINR), an update rate latency, etc. In another example, KPIs for the communication operations (e.g., half-duplex TDD) may include a maximum data rate or throughput, an outage capacity, a BLER, a latency, interference KPIs (e.g., SINR), etc. In another example, KPIs for a JCR scenario (e.g., long range automotive radar such as adaptive cruise control, and high data rate communication) may be configured in accordance with Table 1. Accordingly, the resource allocation of a JCR system may be based on a comparison of one or more sensing KPIs and communication KPIs.

TABLE 1

| Parameter | Value (Example) |
| --- | --- |
| Range | 10-300 m |
| Azimuth FoV | ±15 degrees |
| Velocity | −75 to 60 m/s |
| Range resolution | <0.1 m |
| Velocity resolution | <0.6 m/s |
| Angular resolution | 1-4 degrees |
| Max. number of targets detected | 32 |
| Data rate | Order of Gbps |
| Communication Latency | 100 ms |

Figure 3:
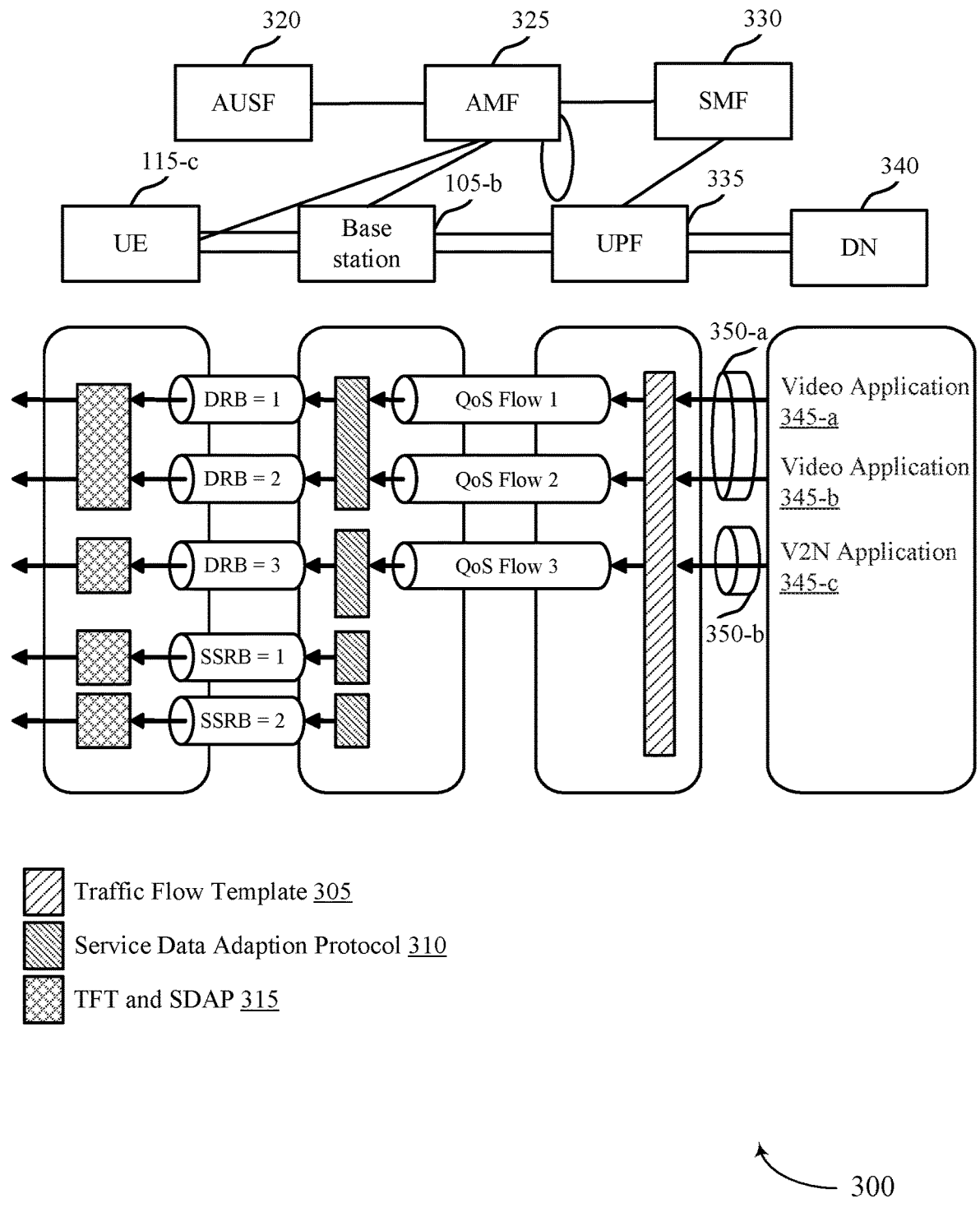
FIG. 3 illustrates an example of a radio bearer configuration procedure that supports techniques for allocating resources for communications and radar sensing in accordance with aspects of the present disclosure.

FIG. 3 illustrates an example of a radio bearer configuration procedure 300 that supports techniques for allocating resources for communications and radar sensing in accordance with aspects of the present disclosure. The radio bearer configuration procedure 300 may configure sensing radio bearers and communication radio bearers for use by network devices, such as base station 105-b, and/or UE 115-c, which may be examples of a base station 105 and a UE 115 as described with reference to FIGS. 1 and 2. In some cases, a UE 115 may implement a joint communication and sensing procedure in accordance with a determined resource allocation based on one or more parameters and/or radio bearers associated with respective communication operations and sensing operations, where the one or more radio bearers may be determined based on the radio bearer configuration procedure 300.

In some wireless communication systems, resource allocation may be based on QoS. A QoS model may be based on QoS Flows and QoS flows may differentiate protocol data unit (PDU) sessions 350. For example, consider multiple PDU sessions 350 (e.g., internet PDU, IMS PDU, streaming service PDU), each of which may generate packets for different applications 345 (e.g., IP flows), where each application 345 may be associated with different QoS requirements. For example, packets from the Internet (e.g., an internet PDU) may be due to a user browsing a website, streaming a video, downloading a large file from a server, etc. Delay and jitter (e.g., QoS requirements) may be important for video applications 345 but may be less important for a packet download application 345. Between a UE 115 and a Data Network (DN) 340, PDU sessions and Service Data Flows (SDFs) may be configured and each application 345 may be configured with a respective SDF. On the radio interface, QoS flows may be mapped to radio bearers that are configured to deliver the respective QoS. Multiple QoS flows can be mapped to a single radio bearer.

Accordingly, a video applications 345-a and 345-b (e.g., Skype video, Whatsapp Video) may be associated with PDU 350-a, and a V2N application 345-c may be associated with PDU 350-b. Applications 345-a, 345-b, and 345-c may be communication applications and may be configured in accordance with an SDF and/or a traffic flow template (TFT) traffic template 305. Then, application 345-a may be configured with QoS Flow 1, application 345-b may be configured with QoS Flow 2, and application 345-c may be configured with QoS flow 3. Each QoS flow may be handled by a service Data Adaption Protocol (SDAP) 310. For example, an SDAP 310 may map a specific QoS Flow within a PDU Session to a corresponding DRB. For example, QoS Flow 1 may be mapped to DRB equal to 1, QoS Flow 2 may be mapped to DRB equal to 2, QoS Flow 3 may be mapped to DRB equal to 3. Each DRB may then be configured based on an SDAP and TFT 315.

QoS flows for communication operations may be controlled by the network (e.g., the session management function (SMF) 330 in core network), and the radio resources for the communication operation may be scheduled per frame by a base station 105. However, sensing operations may be handled differently (e.g., per frame scheduling for sensing operations may not be beneficial). Therefore, the core network may be informed that a bearer is a sensing bearer, and therefore the QoS Profile may inform the base station 105 to handle the sensing bearer differently, as compared to a communication bearer. Accordingly, sensing-specific radio bearers (e.g., SSRBs) may be configured to support sensing operations (e.g., pre-crash, automatic cruise control (ACC)) to configure appropriate resource allocation. In some cases, the sensing operations may be handled as a virtual QoS Flow, so that radio resources of JCR in the same QoS framework may be managed accordingly. In some cases, multiple sensing bearers may be configured, where each sensing radio bearer may correspond to one or more sensing QoS flows, and where the sensing QoS flows may be configured to serve each sensing application. For example, a first sensing application (e.g., a pre-clash application) may be associated with an SSRB equal to 1 and a second sensing application (e.g., ACC) may be associated with an SSRB equal to 2, where SSRBs 1 and 2 may each correspond to a QoS flow.

Each communication QoS flow may be associated with a unique identifier (e.g., QoS Flow Identifier (5QI)). In some cases, QoS flows may be categorized as a Guaranteed Bit Rate (GBR) QoS Flow, a delay-critical GBR flow, or a non-GBR QoS Flow. Each QoS flow may be associated with a QoS profile that includes QoS characteristics, where the QoS characteristics may be based on the bit rate category. Accordingly, each application may be associated with one or more KPIs, and the applications may be associated with a QoS flow that may serve the KPIs of that application. For example, a video application may be associated with a higher priority than a voice application and the applications may be associated with QoS flows and radio bearers to support the different priorities.

The radar applications may be classified similarly to communication services based on the KPI objectives. For example, a pre-crash application may be associated with a low-latency (e.g., 20 ms) and high reliability, whereas ACC comparatively may be associated with a higher latency (e.g., 100 ms) and moderate reliability. Accordingly, the different applications may be assigned a QoS flow and SSRB to support the different KPIs. Sensing QoS can be classified as delay-critical GBR (Guaranteed bit rate) flows (such as, pre-crash applications), or GBR (such as collision avoidance), or non-GBR (such as adaptive cruise control or ACC). Each of the sensing applications may be assigned a corresponding 5G QoS Identifier (5QI) associated a set of QoS characteristics, such as priority level. For example, a pre-crash application may be assigned a higher priority than ACC. In some cases, sensing QoS flows may be organized in a sensing-specific QoS table, or a QoS table that also includes communication QoS flows. For example, Table 2 may include communication QoS flows (e.g., corresponding to a 5QIs of 1, 5, and 82, for example), and sensing QoS flows (e.g., corresponding to a 5QIs of N and N+1).

TABLE 2

| 5QI | Resource type | Priority Level | Packet Delay Budget | Packet Error Rate (PER) | Example Services |
|---|---|---|---|---|---|
| 1 | GBR | 20 | 100 ms | 10-2 | Voice |
| 5 | Non-GBR | 60 | 300 ms | 10-6 | Video |
| 82 | Delay Critical GBR | 22 | 10 ms | 10-5 | Intelligent Transportation Systems |
| N | Delay Critical GBR | x | 20 ms | <Equivalent Conversion of radar detection KPIs to PER> | Pre-crash radar application |
| N + 1 | Non-GBR | y | 100 ms | <Equivalent Conversion of radar detection KPIs to PER> | ACC radar application |

It should be understood that Table 2 is merely an example. Communication and sensing QoS flows may be organized in any manner (not limited to a table). Additionally, any number of communications and sensing QoS flows may be configured to support communication and sensing operations and the QoS characteristics associated with each QoS flow may differ from the examples included in Table 2.

Accordingly, a UE 115 may be configured with one or more radio bearers to support JCR operations. For example, UE 115-c may be configured with one or more communication radio bearers (e.g., based on the one or more communication applications UE 115-c is performing) and one or more sensing radio bearers (e.g., based on the one or more sensing applications UE 115-c is performing). UE 115-a may receive an indication of the one or more radio bearers via a base station 105. For example, base station 105-b may transmit an indication of the communication and sensing radio bearers via one or more control messages (e.g., RRC messages).

To identify which radio bearer to configure a UE 115 with, the network may identify the sensing and communication application that the UE 115 is performing. As the applications may be assigned a QoS flow and radio bearer via a network entity such as a DN 340, user plane function (UPF) 335, SMF 330, Access and Mobility Management Function (AMF) 325, Authentication Server Function (AUSF) 320, a base station 105, or a combination thereof, one or more of the network entities may identify which applications UE 115-c is performing. For example, base station 105-b may configured UE 115-c to perform the one or more applications and accordingly may have knowledge of which applications to determine a QoS flow and radio bearer for. In some other cases, UE 115-c may determine to use an application. For example, UE 115-c may activate a pre-crash sensing application and indicate to base station 105-b that UE 115-c triggered the application. Accordingly, such as indication may trigger base station 105-c and/or one or more other network entities to configure UE 115-c with a sensing radio bearer to support the activated application.

As shown with reference to Table 2, sensing operations and communication operations may be constrained by different KPIs. For example, a communication application may be constrained by a packet error rate (PER) which may not apply to sensing applications. Accordingly, in some cases, SSRB parameters may be translated to parameters defining a communication DRB, or vice versa. In some implementations, lower layer sensing KPIs and upper layer requirements and/or specifications may be mapped (e.g., with equivalent conversion to communication uplink specifications). For example, a radar detection KPI may be equivalently converted to a communication packet error rate KPI. In another example, a radar estimation accuracy KPI may be equivalently converted to a communication throughput requirement KPI. In another example, a sensing priority that may be equated to a communication priority may be defined for radar services based on latency requirements, detection KPIs, estimation KPIs, vehicular environment such as a location, mobility of a UE and radar targets, sensors, RFs, and communication capabilities of a UE 115, or a combination thereof. Accordingly, one or more KPIs and/or parameters of a sensing application may be used to assign a priority number to the sensing application, where the priority number may be compared to priority numbers associated with other communications or sensing applications. In some cases, an equation may be defined to calculate a priority number based on the one or more KPIs and/or parameters. Based on the priority of radar and communication services, a network entity (e.g., such as RRC) may grant resource configuration to respective sensing and communication radio bearers. For example, base station 105-b or some other network entity may determine the resource allocation for the sensing and communication operations based on the configured radio bearers and indicate the resource allocation to UE 115-c. In some implementations, UE 115-c may determine (e.g., autonomously) a resource allocation for sensing and communications operations in a JCR system based on the radio bearers UE 115-c is configured with.

In some cases, one or more sensing bearers and one or more data bearers may be time-domain multiplexed in a set of resources (e.g., a single band, or multi-band) in accordance with a resource allocation. For example, UE 115-c may be configured to perform a first sensing operation in a first resource (e.g., TTI, slot, symbol), a second sensing operation in a second resource, a first communication operation in a third resource, the first sensing operation in a fourth resource, and a second communication operation in a fifth and sixth resources. In some implementations, a base station 105 or some other network entity may manage the one or more SSRBs and/or communication DRBs using a configured grant for a static and/or semi-static environment.

Accordingly, determining a resource allocation for sensing operations and communication operations in a JCR system may be based on respective radio bearers configured for the operations. Each radio bearer may be associated with a respective QoS flow, where each QoS flow may be associated with a set of QoS characteristics (e.g., priority level). Accordingly, the resource allocation may be based on the QoS characteristics associated with each operation so as to satisfy the priority levels, for example.

Figure 4:
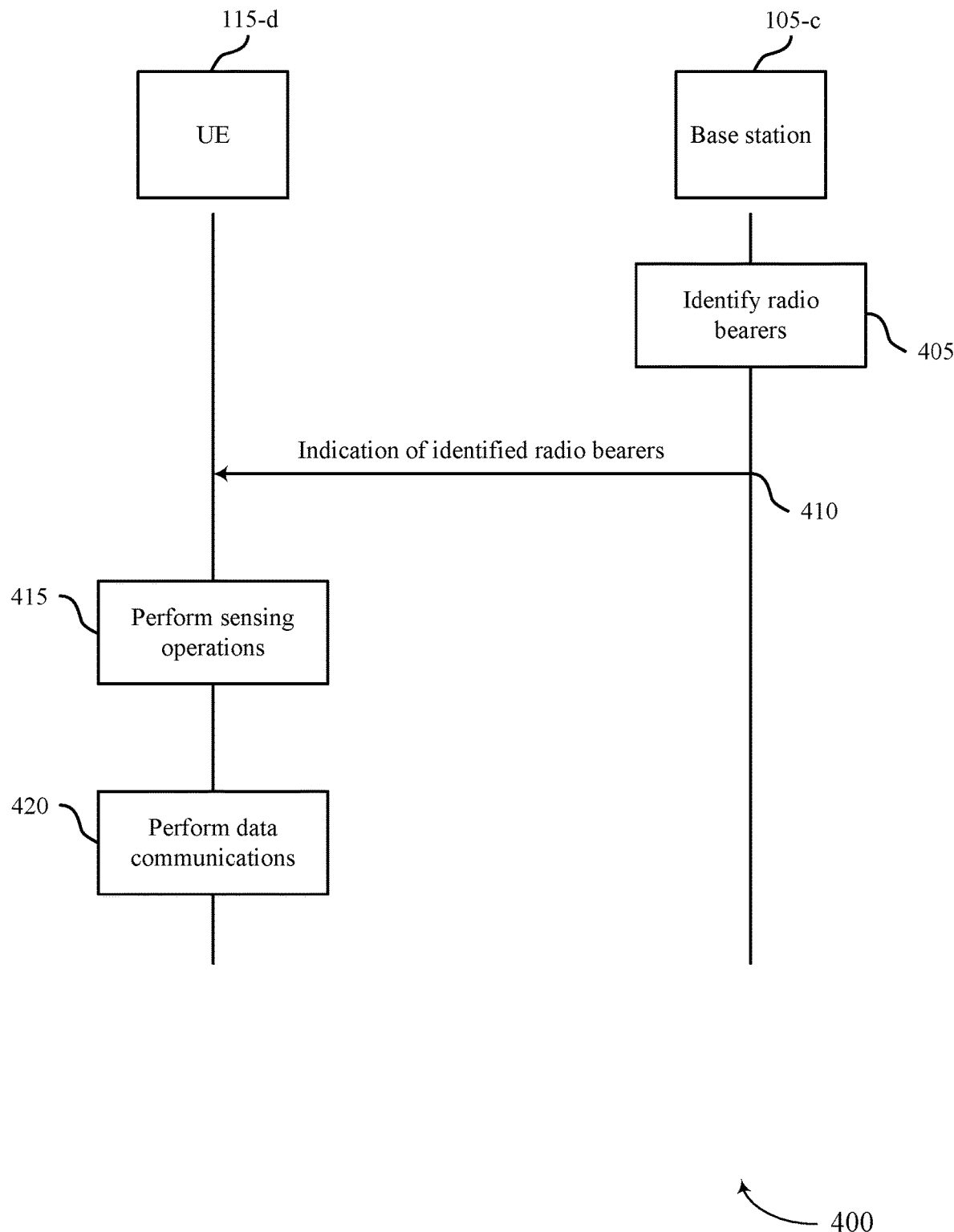
FIG. 4 illustrates an example of a process flow that supports techniques for allocating resources for communications and radar sensing in accordance with aspects of the present disclosure.

FIG. 4 illustrates an example of a process flow 400 that supports techniques for allocating resources for communications and radar sensing in accordance with aspects of the present disclosure. The process flow 400 may illustrate an example of a joint communication and sensing procedure in accordance with the techniques described herein. For example, base station 105-c may allocate radio bearers to UE 115-d for use in allocating resources to sensing and communication operations. Base station 105-c and UE 115-d may be examples of the corresponding wireless devices described with reference to FIGS. 1 through 3. In some cases, instead of UE 115-d implementing the JCR procedure, a different type of wireless device (e.g., a base station 105, network node) may perform a same or similar procedure. Alternative examples of the following may be implemented, where some steps are performed in a different order than described or are not performed at all. In some cases, steps may include additional features not mentioned below, or further steps may be added.

At 405, base station 105-c may identify a first radio bearer to be used for sensing operations and a second radio bearer to be used for data communications.

At 410, base station 105-c may transmit, to UE 115-d, a control message indicating the first radio bearer and the second radio bearer. The first radio bearer and the second radio bearer may be indicative of a resource allocation for the sensing operations and the data communications. The first radio bearer may be a sensing radio bearer and may be associated with a set of sensing quality of service flows. Each sensing quality of service flow may be associated with a quality of service indicator and a set of quality of service characteristics. Each sensing quality of service flow may be classified as a delay-critical guaranteed bit rate flow, a guaranteed bit rate flow, or a non-guaranteed bit rate flow. The set of quality of service characteristics may include one or more of a resource type, a priority level, a packet delay budget, or a set of example services.

In some implementations, UE 115-d may identify a start of an application, where the sensing operations may be associated with serving the application, and UE 115-d may transmit, to base station 105-c, an indication of the start of the application. Receiving the control message indicating the first radio bearer and the second radio bearer may be based at least in part on transmitting the indication of the start of the application. The application may be associated with a sensing quality of service flow and the sensing quality of service flow may be associated with the first radio bearer. In some cases, base station 105-c may identify that the application is associated with a sensing quality of service flow, and select the first radio bearer from a set of sensing radio bearers based at least in part on the sensing quality of service flow being associated with the first radio bearer, wherein the first radio bearer may be a sensing radio bearer.

The application may be a pre-crash application, or an adaptive cruise control application. The pre-crash application may be associated with a higher priority than the adaptive cruise control application.

In some cases, UE 115-d may receive, from base station 105-c, an indication of the resource allocation based at least in part on the first radio bearer and the second radio bearer. Receiving the indication may include receiving a radio resource control message including the indication of the resource allocation. For example, in some cases, base station 105-c may allocate a first set of time resources to the first radio bearer, and a second set of time resources to the second radio bearer, where the first set of time resources and the second set of time resources may be associated with a same frequency band. The first set of time resources and the second set of time resources may be allocated in accordance with time division multiplexing. In some cases, base station 105-c may allocate resources for a first set of radio bearers for the sensing operations and resources for a second set of radio bearers for the data communications in accordance with time division multiplexing.

In some implementations, base station 105-c may compare a first set of parameters associated with the sensing operations and a second set of parameters associated with the data communications, where the resource allocation may be based on the comparison. The first set of parameters and the second set of parameters may each include one or more key performance indicators, a packet error rate, an estimation accuracy, throughput requirements, a priority, latency requirements, an environment indication, a mobility indication, sensor capabilities, radio frequency capabilities, or communication capabilities.

At 415, UE 115-d may perform the sensing operations in accordance with a resource allocation, where the resource allocation may be on the first radio bearer and the second radio bearer. Performing the sensing operations may include performing radar sensing, or lidar sensing, or both in accordance with the resource allocation.

At 420, UE 115-d may perform the data communications in accordance with the resource allocation, where the resource allocation may be based on the first radio bearer and the second radio bearer.

In some implementations, performing the sensing operations and the data communications may include performing time division multiplexing in accordance with the resource allocation to perform the sensing operations and the data communications in a same frequency band. The resource allocation may allocate a first set of time resources to the first radio bearer, and allocate a second set of time resources to the second radio bearer. The first set of time resources and the second set of time resources may be associated with the same frequency band.

In some cases, performing the sensing operations and the data communications may include performing time division multiplexing of a first set of radio bearers for the sensing operations and a second set of radio bearers for the data communications. The first radio bearer may be associated with a first priority and the second radio bearer may be associated with a second priority. The resource allocation may be based on the first priority and the second priority.

In some cases, performing the sensing operations and the data communications may include performing the sensing operations and the data communications using a joint communication and sensing system, where the joint communication and sensing system may be a cooperative system or a co-design system.

Figure 5:
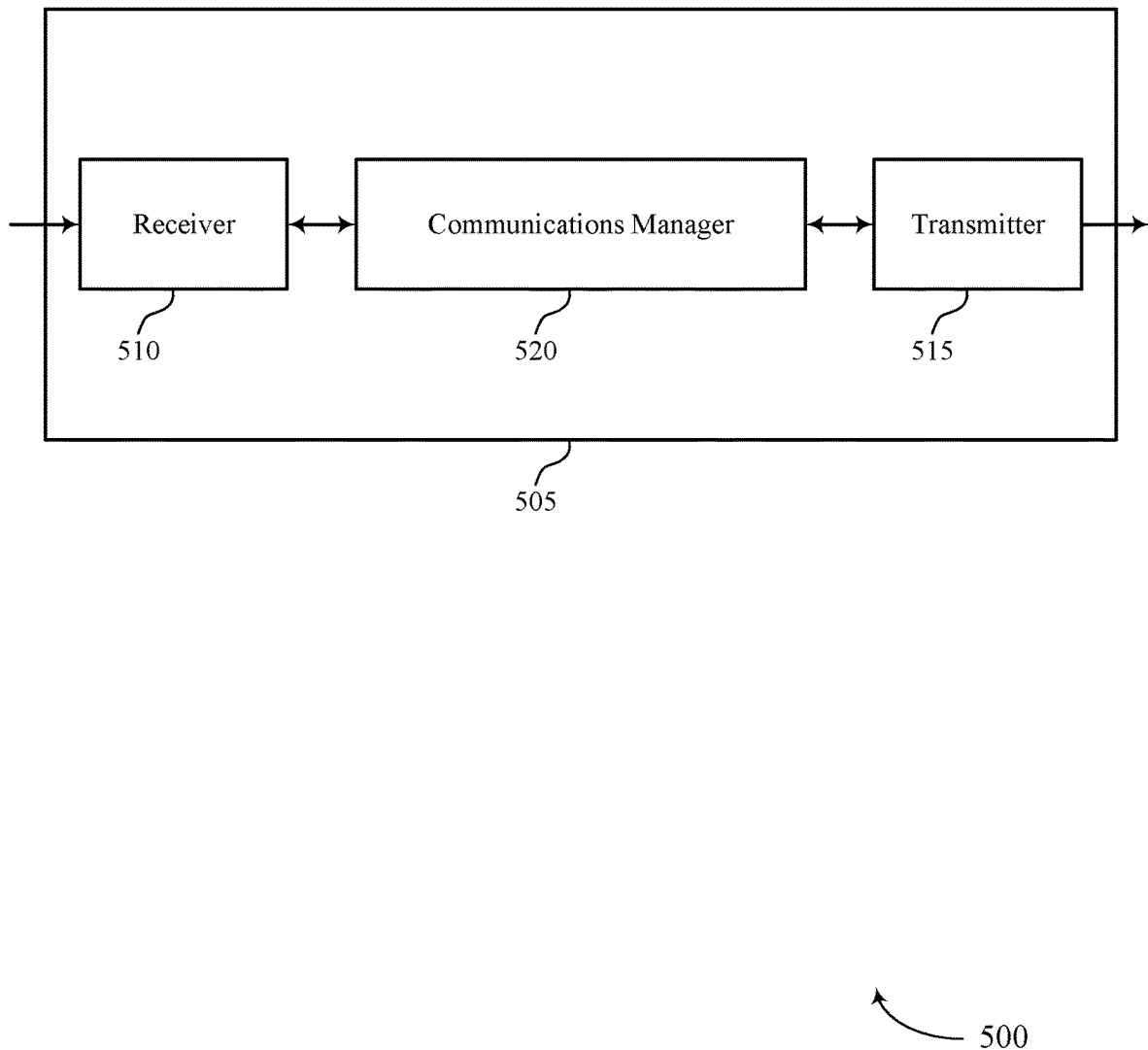
FIGS. 5 and 6 show block diagrams of devices that support techniques for allocating resources for communications and radar sensing in accordance with aspects of the present disclosure.

FIG. 5 shows a block diagram 500 of a device 505 that supports techniques for allocating resources for communications and radar sensing in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for allocating resources for communications and radar sensing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for allocating resources for communications and radar sensing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for allocating resources for communications and radar sensing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving a control message indicating a first radio bearer to be used for sensing operations and a second radio bearer to be used for data communications. The communications manager 520 may be configured as or otherwise support a means for performing the sensing operations in accordance with a resource allocation, the resource allocation based on the first radio bearer and the second radio bearer. The communications manager 520 may be configured as or otherwise support a means for performing the data communications in accordance with the resource allocation, the resource allocation based on the first radio bearer and the second radio bearer.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
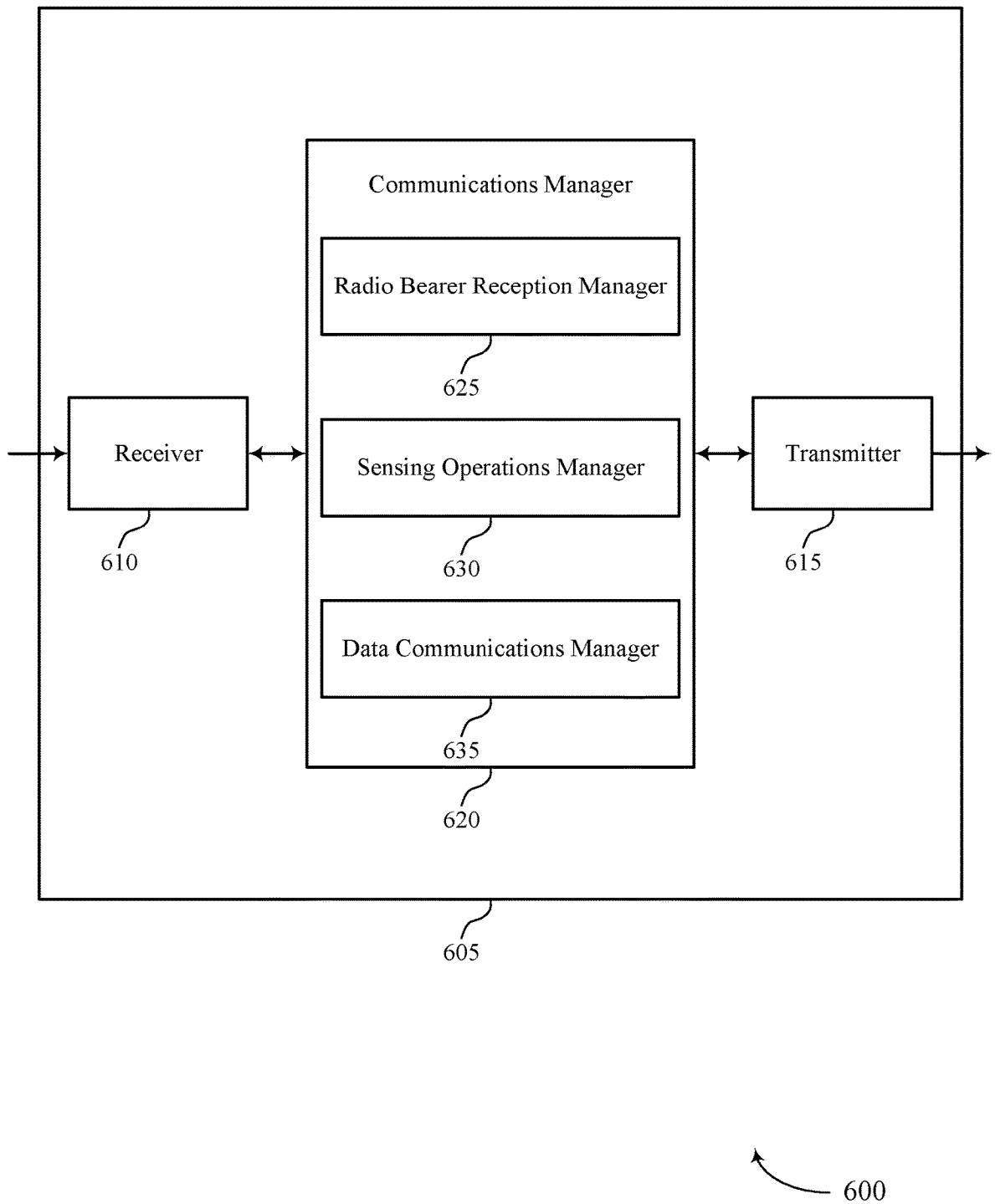

FIG. 6 shows a block diagram 600 of a device 605 that supports techniques for allocating resources for communications and radar sensing in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for allocating resources for communications and radar sensing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for allocating resources for communications and radar sensing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for allocating resources for communications and radar sensing as described herein. For example, the communications manager 620 may include a radio bearer reception manager 625, a sensing operations manager 630, a data communications manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The radio bearer reception manager 625 may be configured as or otherwise support a means for receiving a control message indicating a first radio bearer to be used for sensing operations and a second radio bearer to be used for data communications. The sensing operations manager 630 may be configured as or otherwise support a means for performing the sensing operations in accordance with a resource allocation, the resource allocation based on the first radio bearer and the second radio bearer. The data communications manager 635 may be configured as or otherwise support a means for performing the data communications in accordance with the resource allocation, the resource allocation based on the first radio bearer and the second radio bearer.

Figure 7:
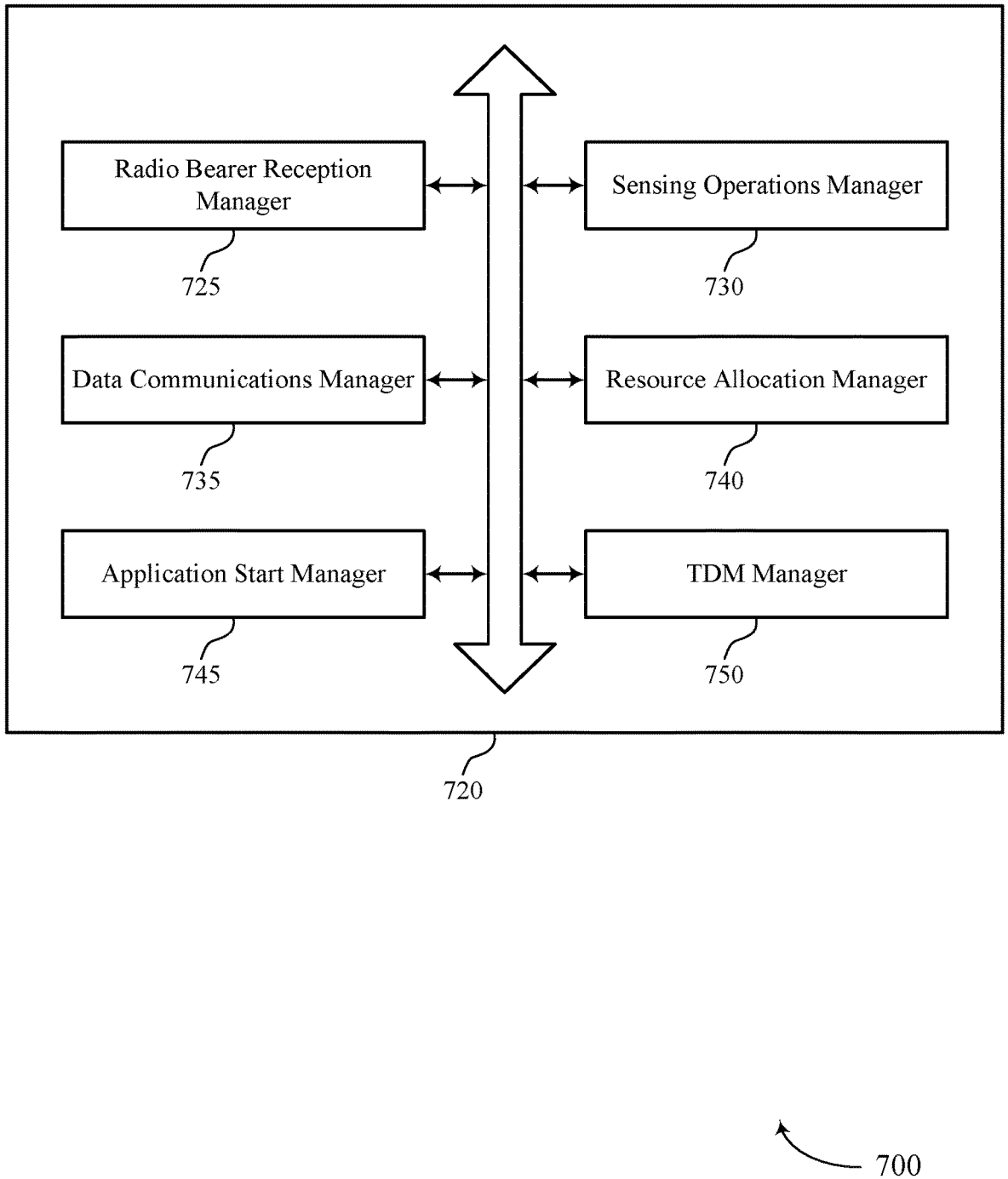
FIG. 7 shows a block diagram of a communications manager that supports techniques for allocating resources for communications and radar sensing in accordance with aspects of the present disclosure.

FIG. 7 shows a block diagram 700 of a communications manager 720 that supports techniques for allocating resources for communications and radar sensing in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for allocating resources for communications and radar sensing as described herein. For example, the communications manager 720 may include a radio bearer reception manager 725, a sensing operations manager 730, a data communications manager 735, a resource allocation manager 740, an application start manager 745, a TDM manager 750, or any combination thereof. Each of these components may communicate, directly or indirectly, with one another (e.g., via one or more buses).

The communications manager 720 may support wireless communications at a UE in accordance with examples as disclosed herein. The radio bearer reception manager 725 may be configured as or otherwise support a means for receiving a control message indicating a first radio bearer to be used for sensing operations and a second radio bearer to be used for data communications. The sensing operations manager 730 may be configured as or otherwise support a means for performing the sensing operations in accordance with a resource allocation, the resource allocation based on the first radio bearer and the second radio bearer. The data communications manager 735 may be configured as or otherwise support a means for performing the data communications in accordance with the resource allocation, the resource allocation based on the first radio bearer and the second radio bearer.

In some examples, the resource allocation manager 740 may be configured as or otherwise support a means for receiving, from a base station, an indication of the resource allocation based on the first radio bearer and the second radio bearer.

In some examples, to support receiving the indication, the resource allocation manager 740 may be configured as or otherwise support a means for receiving a radio resource control message including the indication of the resource allocation.

In some examples, the application start manager 745 may be configured as or otherwise support a means for identifying a start of an application, the sensing operations associated with serving the application. In some examples, the application start manager 745 may be configured as or otherwise support a means for transmitting, to a base station, an indication of the start of the application, where receiving the control message indicating the first radio bearer and the second radio bearer is based on transmitting the indication of the start of the application.

In some examples, the application is associated with a sensing quality of service flow and the sensing quality of service flow is associated with the first radio bearer.

In some examples, the application is a pre-crash application, or an adaptive cruise control application.

In some examples, the pre-crash application is associated with a higher priority than the adaptive cruise control application.

In some examples, the first radio bearer is a sensing radio bearer and is associated with a set of sensing quality of service flows, each sensing quality of service flow is associated with a quality of service indicator and a set of quality of service characteristics.

In some examples, each sensing quality of service flow is classified as a delay-critical guaranteed bit rate flow, a guaranteed bit rate flow, or a non-guaranteed bit rate flow.

In some examples, the set of quality of service characteristics includes one or more of a resource type, a priority level, a packet delay budget, or a set of example services.

In some examples, to support performing the sensing operations and the data communications, the TDM manager 750 may be configured as or otherwise support a means for performing time division multiplexing in accordance with the resource allocation to perform the sensing operations and the data communications in a same frequency band.

In some examples, the resource allocation allocates a first set of time resources to the first radio bearer, and allocates a second set of time resources to the second radio bearer, the first set of time resources and the second set of time resources associated with the same frequency band.

In some examples, to support performing the sensing operations and the data communications, the TDM manager 750 may be configured as or otherwise support a means for performing time division multiplexing of a first set of radio bearers for the sensing operations and a second set of radio bearers for the data communications.

In some examples, the first radio bearer is associated with a first priority and the second radio bearer is associated with a second priority, the resource allocation based on the first priority and the second priority.

In some examples, to support performing the sensing operations, the sensing operations manager 730 may be configured as or otherwise support a means for performing radar sensing, or lidar sensing, or both in accordance with the resource allocation.

In some examples, to support performing the sensing operations and the data communications, the sensing operations manager 730 may be configured as or otherwise support a means for performing the sensing operations and the data communications using a joint communication and sensing system, where the joint communication and sensing system is a cooperative system or a co-design system.

Figure 8:
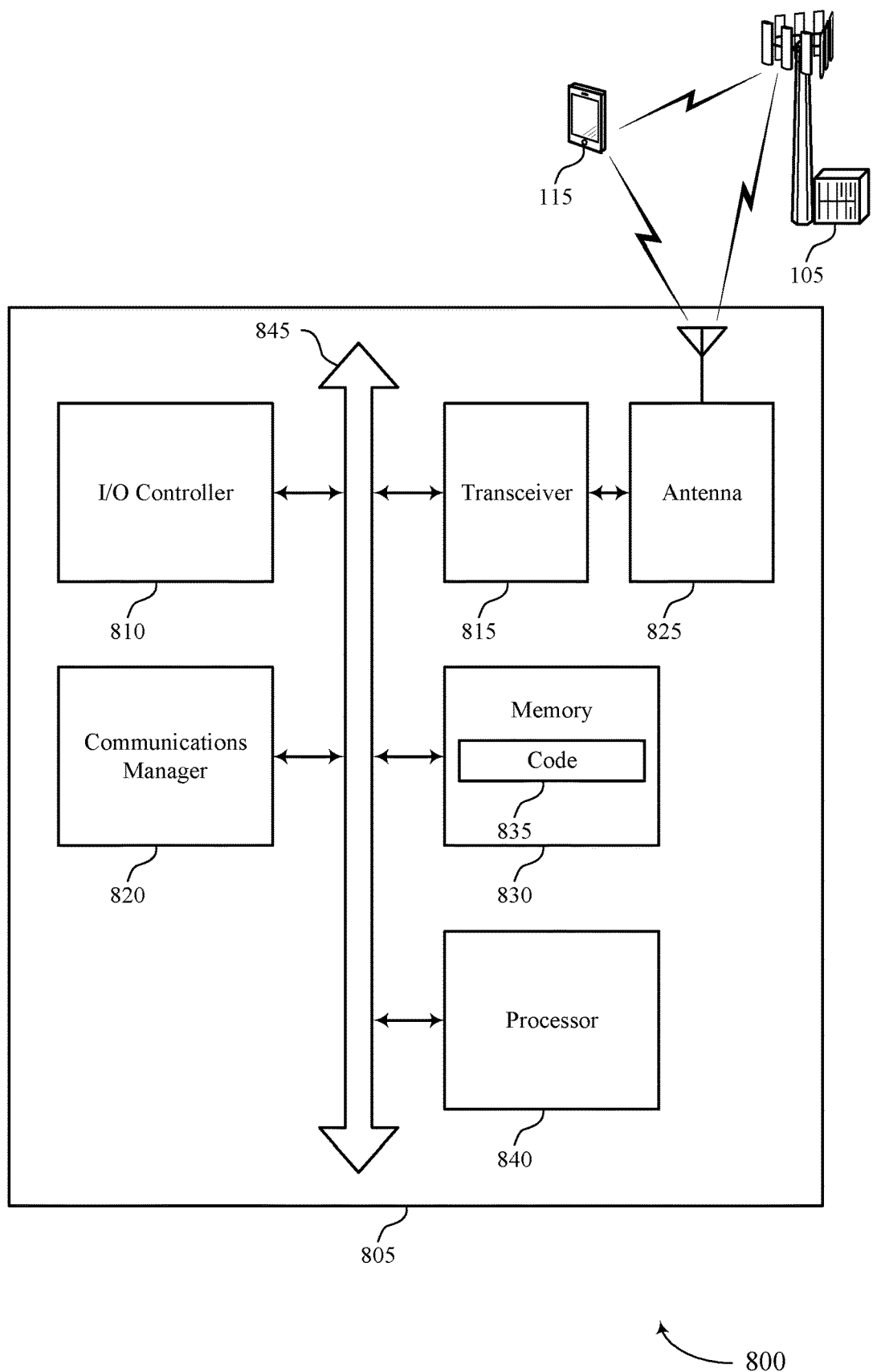
FIG. 8 shows a diagram of a system including a device that supports techniques for allocating resources for communications and radar sensing in accordance with aspects of the present disclosure.

FIG. 8 shows a diagram of a system 800 including a device 805 that supports techniques for allocating resources for communications and radar sensing in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for allocating resources for communications and radar sensing). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a control message indicating a first radio bearer to be used for sensing operations and a second radio bearer to be used for data communications. The communications manager 820 may be configured as or otherwise support a means for performing the sensing operations in accordance with a resource allocation, the resource allocation based on the first radio bearer and the second radio bearer. The communications manager 820 may be configured as or otherwise support a means for performing the data communications in accordance with the resource allocation, the resource allocation based on the first radio bearer and the second radio bearer.

By including or configuring the communications manager 820 in accordance with examples as described herein, the device 805 may support techniques for improved communication reliability, reduced latency, and more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for allocating resources for communications and radar sensing as described herein, or the processor 840 and the memory 830 may be otherwise configured to perform or support such operations.

Figure 9:
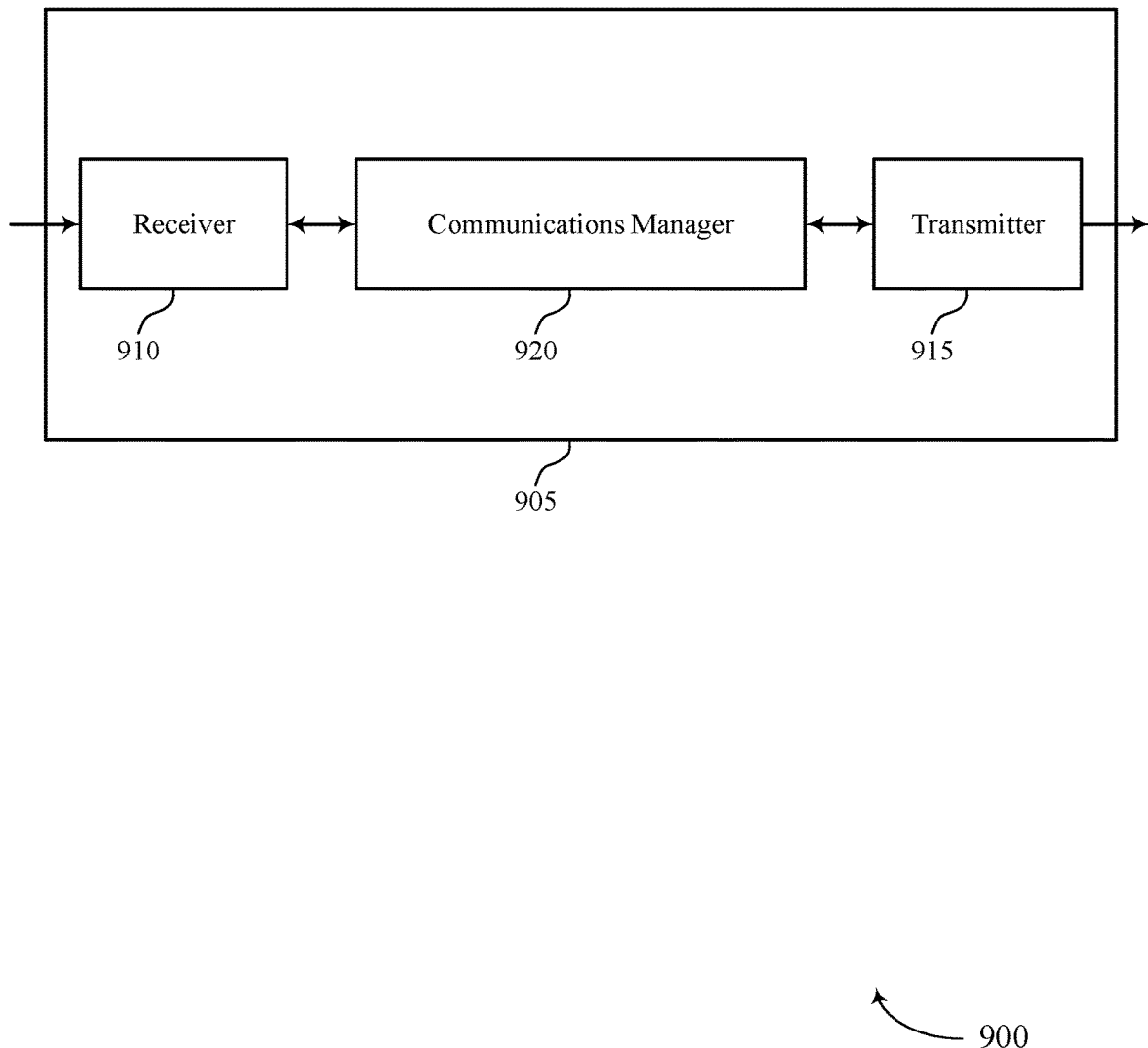
FIGS. 9 and 10 show block diagrams of devices that support techniques for allocating resources for communications and radar sensing in accordance with aspects of the present disclosure.

FIG. 9 shows a block diagram 900 of a device 905 that supports techniques for allocating resources for communications and radar sensing in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for allocating resources for communications and radar sensing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for allocating resources for communications and radar sensing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for allocating resources for communications and radar sensing as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for identifying a first radio bearer to be used for sensing operations and a second radio bearer to be used for data communications. The communications manager 920 may be configured as or otherwise support a means for transmitting, to a UE, a control message indicating the first radio bearer and the second radio bearer, the first radio bearer and the second radio bearer indicative of a resource allocation for the sensing operations and the data communications.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources.

Figure 10:
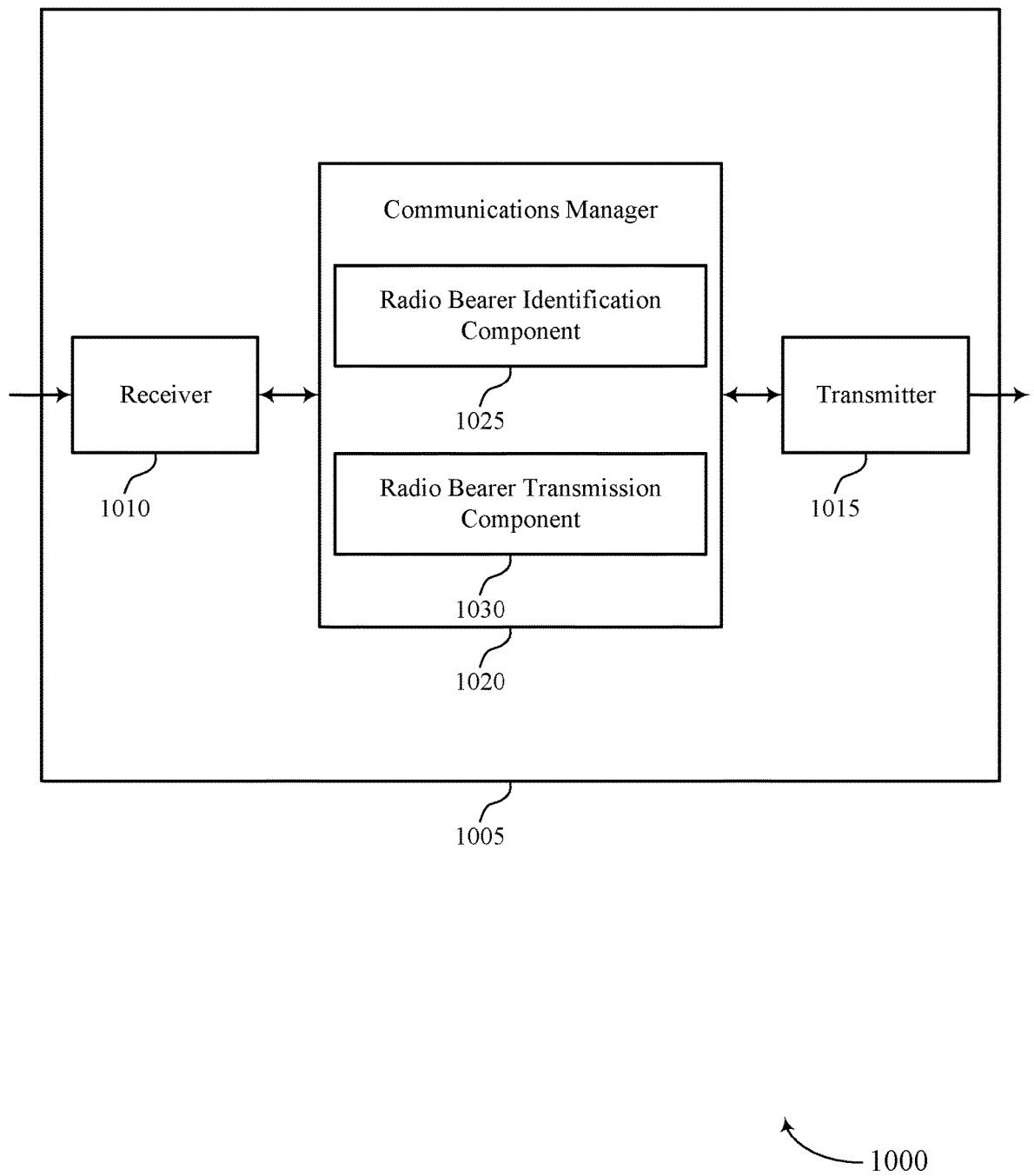

FIG. 10 shows a block diagram 1000 of a device 1005 that supports techniques for allocating resources for communications and radar sensing in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for allocating resources for communications and radar sensing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for allocating resources for communications and radar sensing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for allocating resources for communications and radar sensing as described herein. For example, the communications manager 1020 may include a radio bearer identification component 1025 a radio bearer transmission component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The radio bearer identification component 1025 may be configured as or otherwise support a means for identifying a first radio bearer to be used for sensing operations and a second radio bearer to be used for data communications. The radio bearer transmission component 1030 may be configured as or otherwise support a means for transmitting, to a UE, a control message indicating the first radio bearer and the second radio bearer, the first radio bearer and the second radio bearer indicative of a resource allocation for the sensing operations and the data communications.

Figure 11:
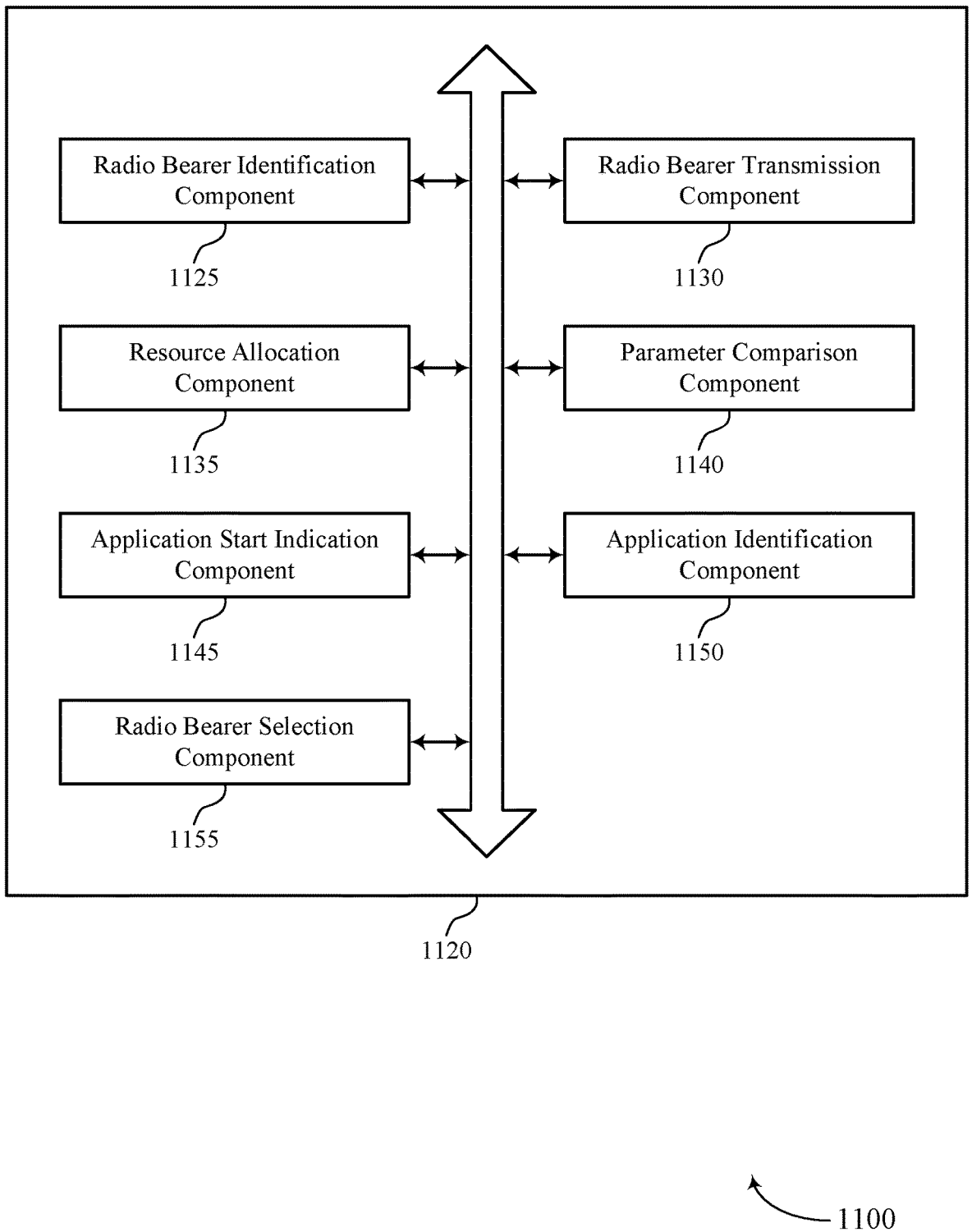
FIG. 11 shows a block diagram of a communications manager that supports techniques for allocating resources for communications and radar sensing in accordance with aspects of the present disclosure.

FIG. 11 shows a block diagram 1100 of a communications manager 1120 that supports techniques for allocating resources for communications and radar sensing in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for allocating resources for communications and radar sensing as described herein. For example, the communications manager 1120 may include a radio bearer identification component 1125, a radio bearer transmission component 1130, a resource allocation component 1135, a parameter comparison component 1140, an application start indication component 1145, an application identification component 1150, a radio bearer selection component 1155, or any combination thereof. Each of these components may communicate, directly or indirectly, with one another (e.g., via one or more buses).

The communications manager 1120 may support wireless communications at a base station in accordance with examples as disclosed herein. The radio bearer identification component 1125 may be configured as or otherwise support a means for identifying a first radio bearer to be used for sensing operations and a second radio bearer to be used for data communications. The radio bearer transmission component 1130 may be configured as or otherwise support a means for transmitting, to a UE, a control message indicating the first radio bearer and the second radio bearer, the first radio bearer and the second radio bearer indicative of a resource allocation for the sensing operations and the data communications.

In some examples, the resource allocation component 1135 may be configured as or otherwise support a means for transmitting, to the UE, an indication of the resource allocation based on the first radio bearer and the second radio bearer.

In some examples, the resource allocation component 1135 may be configured as or otherwise support a means for allocating a first set of time resources to the first radio bearer, and a second set of time resources to the second radio bearer, where the first set of time resources and the second set of time resources are associated with a same frequency band, the first set of time resources and the second set of time resources allocated in accordance with time division multiplexing.

In some examples, the resource allocation component 1135 may be configured as or otherwise support a means for allocating resources for a first set of radio bearers for the sensing operations and resources for a second set of radio bearers for the data communications in accordance with time division multiplexing.

In some examples, to support transmitting the indication, the resource allocation component 1135 may be configured as or otherwise support a means for transmitting a radio resource control message including the indication of the resource allocation.

In some examples, the parameter comparison component 1140 may be configured as or otherwise support a means for comparing a first set of parameters associated with the sensing operations and a second set of parameters associated with the data communications, where the resource allocation is based on the comparison.

In some examples, the first set of parameters and the second set of parameters each include one or more key performance indicators, a packet error rate, an estimation accuracy, throughput requirements, a priority, latency requirements, an environment indication, a mobility indication, sensor capabilities, radio frequency capabilities, or communication capabilities.

In some examples, the application start indication component 1145 may be configured as or otherwise support a means for receiving, from the UE, an indication of a start of an application by the UE, where transmitting the control message indicating the first radio bearer is based on receiving the indication of the start of the application.

In some examples, the application identification component 1150 may be configured as or otherwise support a means for identifying that the application is associated with a sensing quality of service flow. In some examples, the radio bearer selection component 1155 may be configured as or otherwise support a means for selecting the first radio bearer from a set of sensing radio bearers based on the sensing quality of service flow being associated with the first radio bearer, where the first radio bearer is a sensing radio bearer.

In some examples, the first radio bearer is associated with a set of sensing quality of service flows, each sensing quality of service flow is associated with a quality of service indicator and a set of quality of service characteristics.

In some examples, each sensing quality of service flow is classified as a delay-critical guaranteed bit rate flow, a guaranteed bit rate flow, or a non-guaranteed bit rate flow.

In some examples, the set of quality of service characteristics includes one or more of a resource type, a priority level, a packet delay budget, or a set of example services.

In some examples, the application identification component 1150 may be configured as or otherwise support a means for identifying that the application is a pre-crash application, or an adaptive cruise control application.

In some examples, the pre-crash application is associated with a higher priority than the adaptive cruise control application.

In some examples, the first radio bearer is associated with a first priority and the second radio bearer is associated with a second priority, the resource allocation based on the first priority and the second priority.

In some examples, the sensing operations include radar sensing, or lidar sensing, or both.

Figure 12:
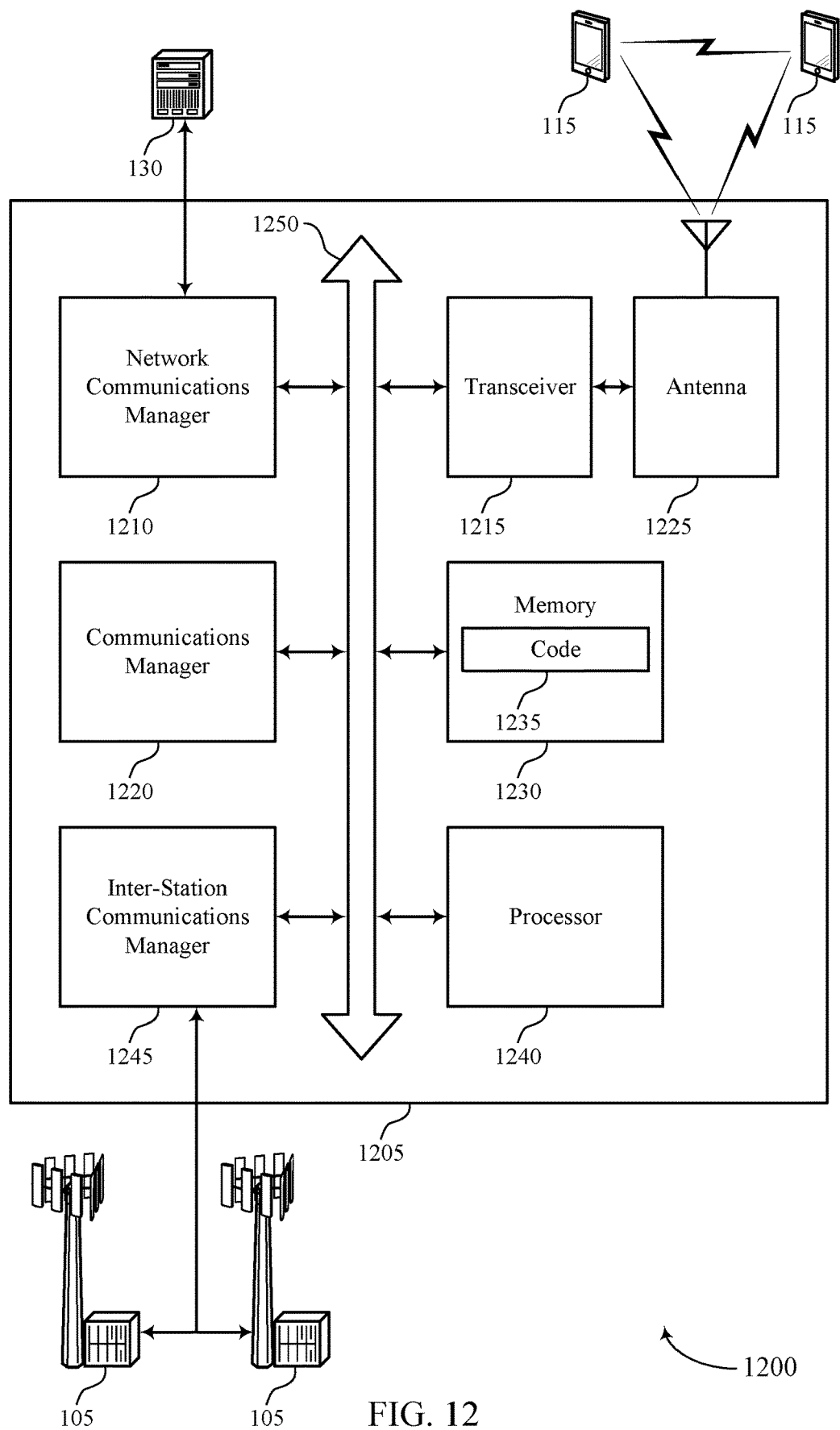
FIG. 12 shows a diagram of a system including a device that supports techniques for allocating resources for communications and radar sensing in accordance with aspects of the present disclosure.

FIG. 12 shows a diagram of a system 1200 including a device 1205 that supports techniques for allocating resources for communications and radar sensing in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for allocating resources for communications and radar sensing). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for identifying a first radio bearer to be used for sensing operations and a second radio bearer to be used for data communications. The communications manager 1220 may be configured as or otherwise support a means for transmitting, to a UE, a control message indicating the first radio bearer and the second radio bearer, the first radio bearer and the second radio bearer indicative of a resource allocation for the sensing operations and the data communications.

By including or configuring the communications manager 1220 in accordance with examples as described herein, the device 1205 may support techniques for improved communication reliability, reduced latency, and more efficient utilization of communication resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for allocating resources for communications and radar sensing as described herein, or the processor 1240 and the memory 1230 may be otherwise configured to perform or support such operations.

Figure 13:
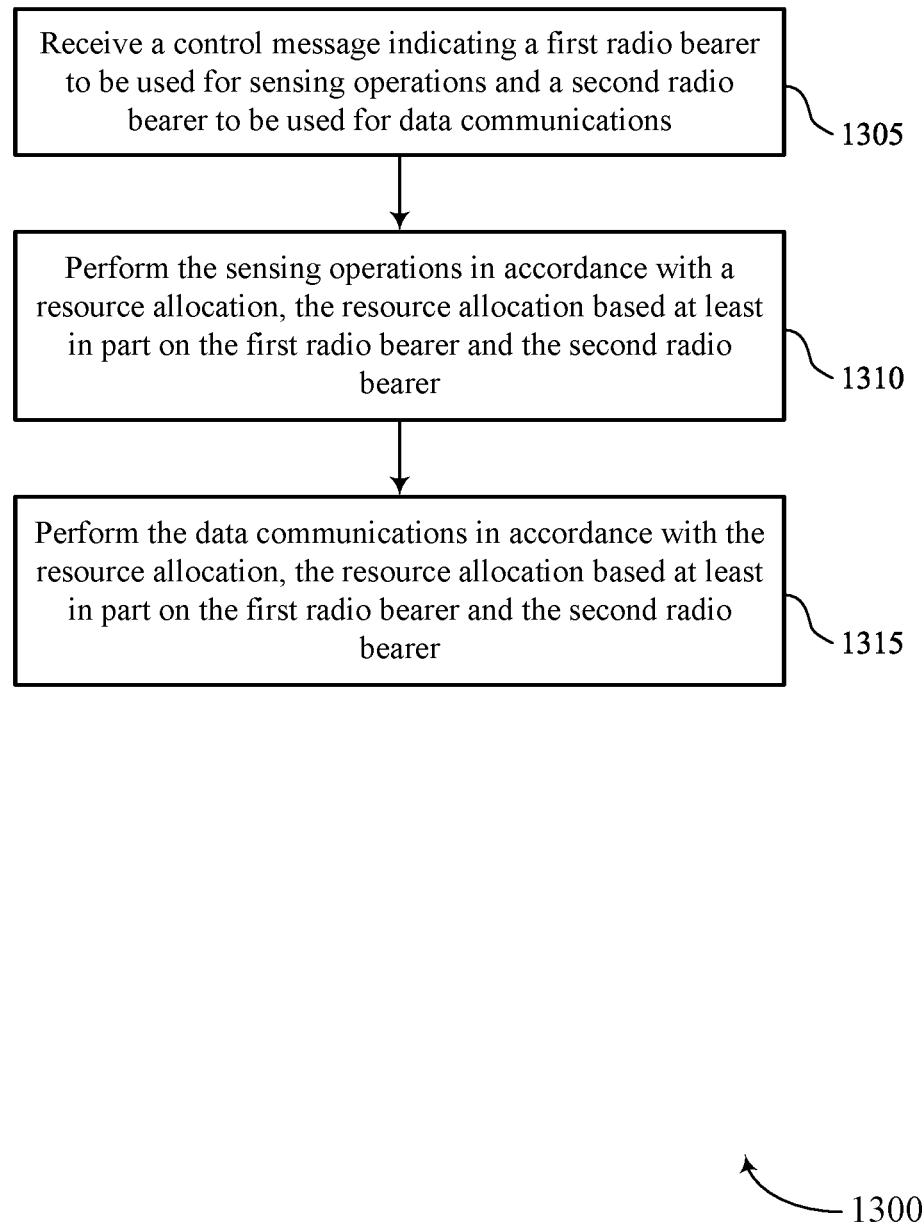
FIGS. 13 through 16 show flowcharts illustrating methods that support techniques for allocating resources for communications and radar sensing in accordance with aspects of the present disclosure.

FIG. 13 shows a flowchart illustrating a method 1300 that supports techniques for allocating resources for communications and radar sensing in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a control message indicating a first radio bearer to be used for sensing operations and a second radio bearer to be used for data communications. The operations of 1305 may be performed in accordance with examples as disclosed herein. In some examples, aspects of the operations of 1305 may be performed by a radio bearer reception manager 725 as described with reference to FIG. 7.

At 1310, the method may include performing the sensing operations in accordance with a resource allocation, the resource allocation based on the first radio bearer and the second radio bearer. The operations of 1310 may be performed in accordance with examples as disclosed herein. In some examples, aspects of the operations of 1310 may be performed by a sensing operations manager 730 as described with reference to FIG. 7.

At 1315, the method may include performing the data communications in accordance with the resource allocation, the resource allocation based on the first radio bearer and the second radio bearer. The operations of 1315 may be performed in accordance with examples as disclosed herein. In some examples, aspects of the operations of 1315 may be performed by a data communications manager 735 as described with reference to FIG. 7.

Figure 14:
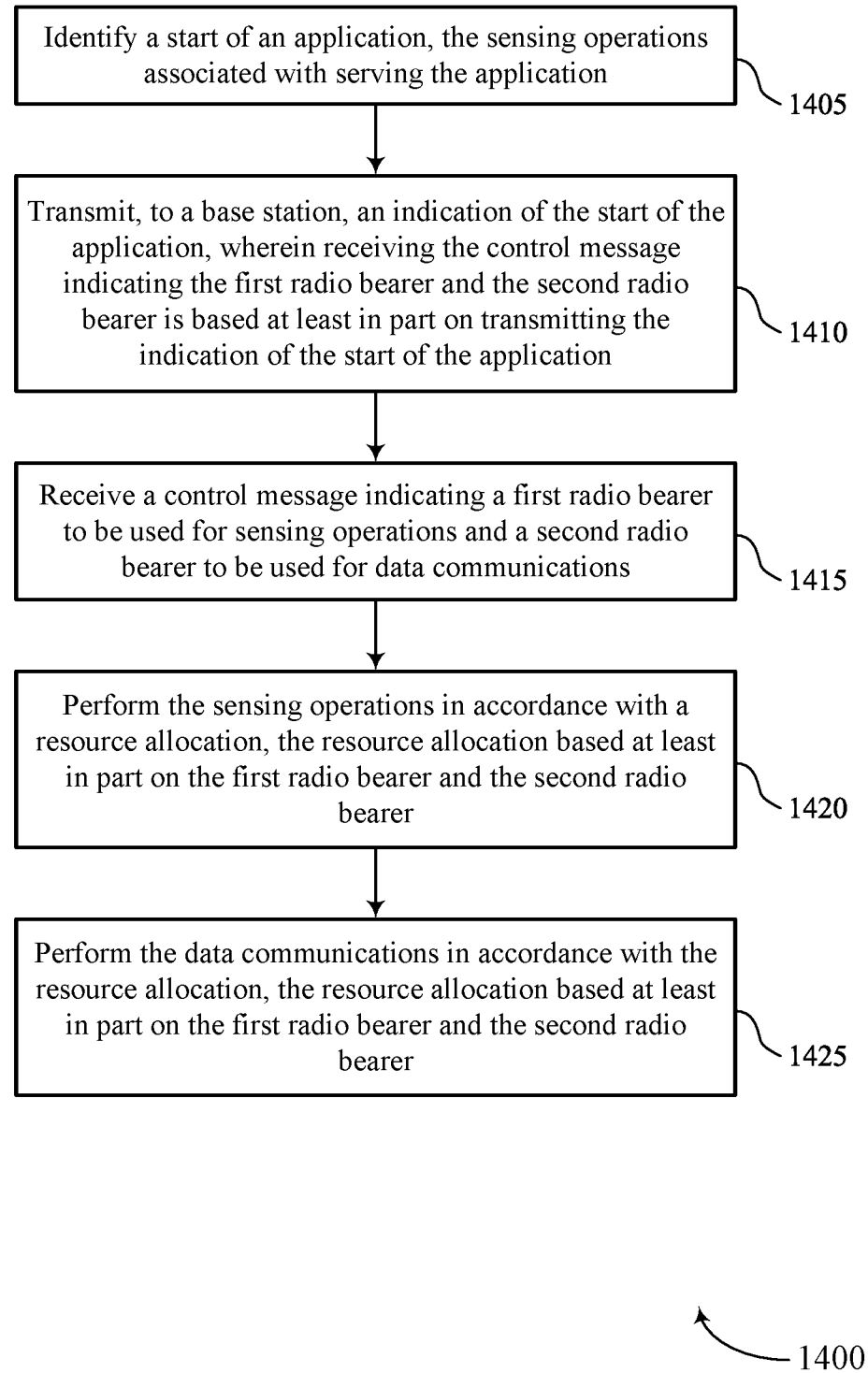

FIG. 14 shows a flowchart illustrating a method 1400 that supports techniques for allocating resources for communications and radar sensing in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include identifying a start of an application, the sensing operations associated with serving the application. The operations of 1405 may be performed in accordance with examples as disclosed herein. In some examples, aspects of the operations of 1405 may be performed by an application start manager 745 as described with reference to FIG. 7.

At 1410, the method may include transmitting, to a base station, an indication of the start of the application, where receiving the control message indicating the first radio bearer and the second radio bearer is based on transmitting the indication of the start of the application. The operations of 1410 may be performed in accordance with examples as disclosed herein. In some examples, aspects of the operations of 1410 may be performed by an application start manager 745 as described with reference to FIG. 7.

At 1415, the method may include receiving a control message indicating a first radio bearer to be used for sensing operations and a second radio bearer to be used for data communications. The operations of 1415 may be performed in accordance with examples as disclosed herein. In some examples, aspects of the operations of 1415 may be performed by a radio bearer reception manager 725 as described with reference to FIG. 7.

At 1420, the method may include performing the sensing operations in accordance with a resource allocation, the resource allocation based on the first radio bearer and the second radio bearer. The operations of 1420 may be performed in accordance with examples as disclosed herein. In some examples, aspects of the operations of 1420 may be performed by a sensing operations manager 730 as described with reference to FIG. 7.

At 1425, the method may include performing the data communications in accordance with the resource allocation, the resource allocation based on the first radio bearer and the second radio bearer. The operations of 1425 may be performed in accordance with examples as disclosed herein. In some examples, aspects of the operations of 1425 may be performed by a data communications manager 735 as described with reference to FIG. 7.

Figure 15:
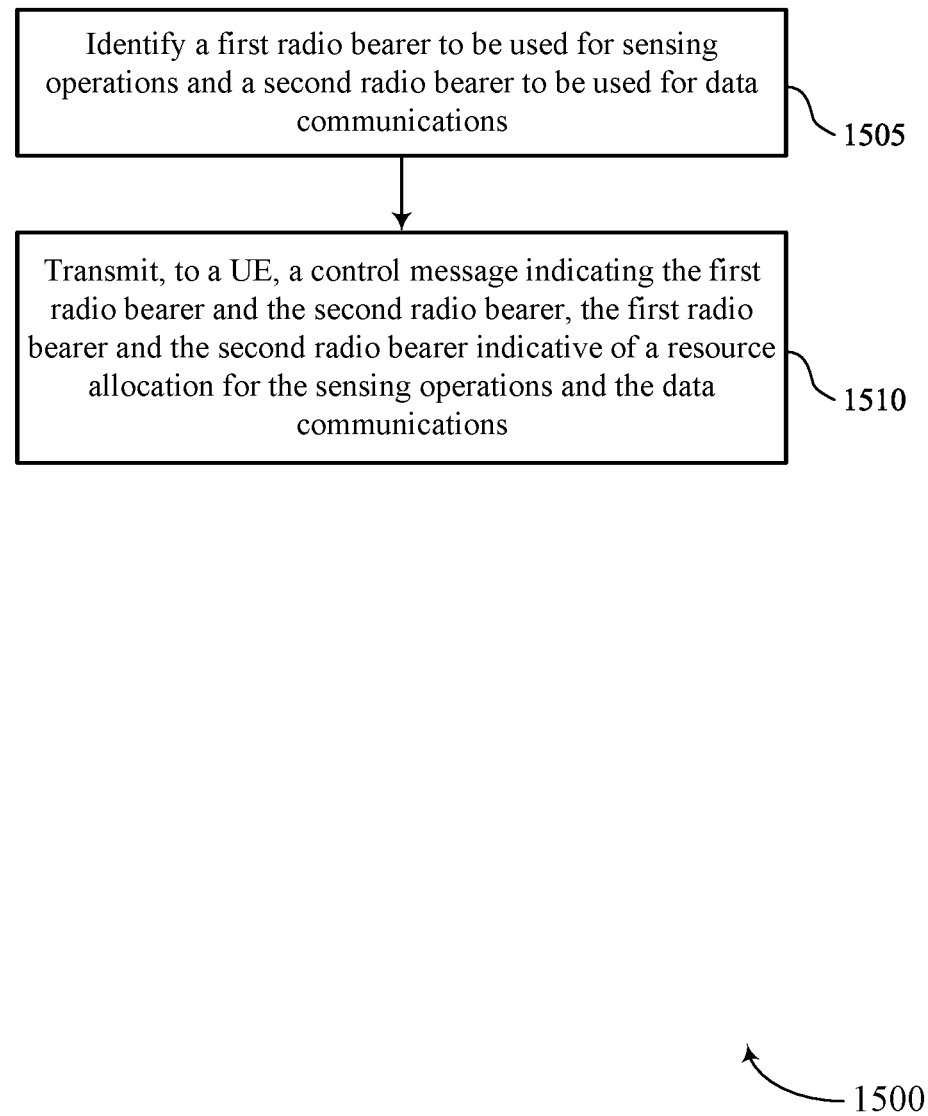

FIG. 15 shows a flowchart illustrating a method 1500 that supports techniques for allocating resources for communications and radar sensing in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include identifying a first radio bearer to be used for sensing operations and a second radio bearer to be used for data communications. The operations of 1505 may be performed in accordance with examples as disclosed herein. In some examples, aspects of the operations of 1505 may be performed by a radio bearer identification component 1125 as described with reference to FIG. 11.

At 1510, the method may include transmitting, to a UE, a control message indicating the first radio bearer and the second radio bearer, the first radio bearer and the second radio bearer indicative of a resource allocation for the sensing operations and the data communications. The operations of 1510 may be performed in accordance with examples as disclosed herein. In some examples, aspects of the operations of 1510 may be performed by a radio bearer transmission component 1130 as described with reference to FIG. 11.

Figure 16:
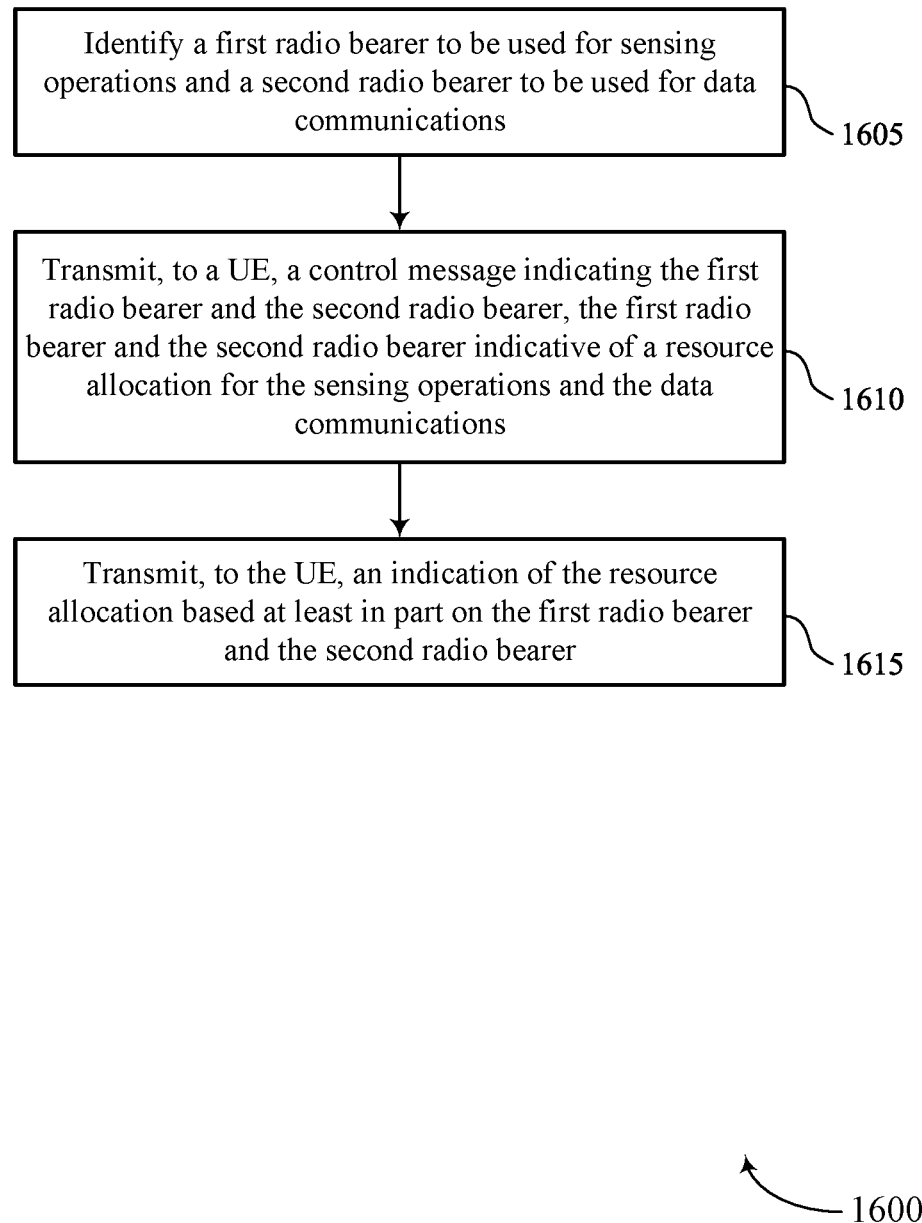

FIG. 16 shows a flowchart illustrating a method 1600 that supports techniques for allocating resources for communications and radar sensing in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include identifying a first radio bearer to be used for sensing operations and a second radio bearer to be used for data communications. The operations of 1605 may be performed in accordance with examples as disclosed herein. In some examples, aspects of the operations of 1605 may be performed by a radio bearer identification component 1125 as described with reference to FIG. 11.

At 1610, the method may include transmitting, to a UE, a control message indicating the first radio bearer and the second radio bearer, the first radio bearer and the second radio bearer indicative of a resource allocation for the sensing operations and the data communications. The operations of 1610 may be performed in accordance with examples as disclosed herein. In some examples, aspects of the operations of 1610 may be performed by a radio bearer transmission component 1130 as described with reference to FIG. 11.

At 1615, the method may include transmitting, to the UE, an indication of the resource allocation based on the first radio bearer and the second radio bearer. The operations of 1615 may be performed in accordance with examples as disclosed herein. In some examples, aspects of the operations of 1615 may be performed by a resource allocation component 1135 as described with reference to FIG. 11.

The following provides an overview of aspects of the present disclosure:

Aspect 1: A method for wireless communications at a UE, comprising: receiving a control message indicating a first radio bearer to be used for sensing operations and a second radio bearer to be used for data communications; performing the sensing operations in accordance with a resource allocation, the resource allocation based at least in part on the first radio bearer and the second radio bearer; and performing the data communications in accordance with the resource allocation, the resource allocation based at least in part on the first radio bearer and the second radio bearer.

Aspect 2: The method of aspect 1, further comprising: receiving, from a base station, an indication of the resource allocation based at least in part on the first radio bearer and the second radio bearer.

Aspect 3: The method of aspect 2, wherein receiving the indication further comprises: receiving a radio resource control message comprising the indication of the resource allocation.

Aspect 4: The method of any of aspects 1 through 3, further comprising: identifying a start of an application, the sensing operations associated with serving the application; and transmitting, to a base station, an indication of the start of the application, wherein receiving the control message indicating the first radio bearer and the second radio bearer is based at least in part on transmitting the indication of the start of the application.

Aspect 5: The method of aspect 4, wherein the application is associated with a sensing quality of service flow and the sensing quality of service flow is associated with the first radio bearer.

Aspect 6: The method of any of aspects 4 through 5, wherein the application is a pre-crash application, or an adaptive cruise control application.

Aspect 7: The method of aspect 6, wherein the pre-crash application is associated with a higher priority than the adaptive cruise control application.

Aspect 8: The method of any of aspects 1 through 7, wherein the first radio bearer is a sensing radio bearer and is associated with a set of sensing quality of service flows, each sensing quality of service flow is associated with a quality of service indicator and a set of quality of service characteristics.

Aspect 9: The method of aspect 8, wherein each sensing quality of service flow is classified as a delay-critical guaranteed bit rate flow, a guaranteed bit rate flow, or a non-guaranteed bit rate flow.

Aspect 10: The method of any of aspects 8 through 9, wherein the set of quality of service characteristics comprises one or more of a resource type, a priority level, a packet delay budget, or a set of example services.

Aspect 11: The method of any of aspects 1 through 10, wherein performing the sensing operations and the data communications further comprises: performing time division multiplexing in accordance with the resource allocation to perform the sensing operations and the data communications in a same frequency band.

Aspect 12: The method of aspect 11, wherein the resource allocation allocates a first set of time resources to the first radio bearer, and allocates a second set of time resources to the second radio bearer, the first set of time resources and the second set of time resources associated with the same frequency band.

Aspect 13: The method of any of aspects 11 through 12, wherein performing the sensing operations and the data communications further comprises: performing time division multiplexing of a first set of radio bearers for the sensing operations and a second set of radio bearers for the data communications.

Aspect 14: The method of any of aspects 1 through 13, wherein the first radio bearer is associated with a first priority and the second radio bearer is associated with a second priority, the resource allocation based at least in part on the first priority and the second priority.

Aspect 15: The method of any of aspects 1 through 14, wherein performing the sensing operations further comprises: performing radar sensing, or lidar sensing, or both in accordance with the resource allocation.

Aspect 16: The method of any of aspects 1 through 15, wherein performing the sensing operations and the data communications further comprises: performing the sensing operations and the data communications using a joint communication and sensing system, wherein the joint communication and sensing system is a cooperative system or a co-design system.

Aspect 17: A method for wireless communications at a base station, comprising: identifying a first radio bearer to be used for sensing operations and a second radio bearer to be used for data communications; and transmitting, to a UE, a control message indicating the first radio bearer and the second radio bearer, the first radio bearer and the second radio bearer indicative of a resource allocation for the sensing operations and the data communications.

Aspect 18: The method of aspect 17, further comprising: transmitting, to the UE, an indication of the resource allocation based at least in part on the first radio bearer and the second radio bearer.

Aspect 19: The method of aspect 18, further comprising: allocating a first set of time resources to the first radio bearer, and a second set of time resources to the second radio bearer, wherein the first set of time resources and the second set of time resources are associated with a same frequency band, the first set of time resources and the second set of time resources allocated in accordance with time division multiplexing.

Aspect 20: The method of aspect 19, further comprising: allocating resources for a first set of radio bearers for the sensing operations and resources for a second set of radio bearers for the data communications in accordance with time division multiplexing.

Aspect 21: The method of any of aspects 18 through 20, wherein transmitting the indication further comprises: transmitting a radio resource control message comprising the indication of the resource allocation.

Aspect 22: The method of any of aspects 17 through 21, further comprising: comparing a first set of parameters associated with the sensing operations and a second set of parameters associated with the data communications, wherein the resource allocation is based at least in part on the comparison.

Aspect 23: The method of aspect 22, wherein the first set of parameters and the second set of parameters each comprise one or more key performance indicators, a packet error rate, an estimation accuracy, throughput requirements, a priority, latency requirements, an environment indication, a mobility indication, sensor capabilities, radio frequency capabilities, or communication capabilities.

Aspect 24: The method of any of aspects 17 through 23, further comprising: receiving, from the UE, an indication of a start of an application by the UE, wherein transmitting the control message indicating the first radio bearer is based at least in part on receiving the indication of the start of the application.

Aspect 25: The method of aspect 24, further comprising: identifying that the application is associated with a sensing quality of service flow; and selecting the first radio bearer from a set of sensing radio bearers based at least in part on the sensing quality of service flow being associated with the first radio bearer, wherein the first radio bearer is a sensing radio bearer.

Aspect 26: The method of aspect 25, wherein the first radio bearer is associated with a set of sensing quality of service flows, each sensing quality of service flow is associated with a quality of service indicator and a set of quality of service characteristics.

Aspect 27: The method of aspect 26, wherein each sensing quality of service flow is classified as a delay-critical guaranteed bit rate flow, a guaranteed bit rate flow, or a non-guaranteed bit rate flow.

Aspect 28: The method of any of aspects 26 through 27, wherein the set of quality of service characteristics comprises one or more of a resource type, a priority level, a packet delay budget, or a set of example services.

Aspect 29: The method of any of aspects 24 through 28, further comprising: identifying that the application is a pre-crash application, or an adaptive cruise control application.

Aspect 30: The method of aspect 29, wherein the pre-crash application is associated with a higher priority than the adaptive cruise control application.

Aspect 31: The method of any of aspects 17 through 30, wherein the first radio bearer is associated with a first priority and the second radio bearer is associated with a second priority, the resource allocation based at least in part on the first priority and the second priority.

Aspect 32: The method of any of aspects 17 through 31, wherein the sensing operations comprise radar sensing, or lidar sensing, or both.

Aspect 33: An apparatus for wireless communications at a UE, comprising a processor; memory coupled with the processor; and instructions stored in the memory and executable by the processor to cause the apparatus to perform a method of any of aspects 1 through 16.

Aspect 34: An apparatus for wireless communications at a UE, comprising at least one means for performing a method of any of aspects 1 through 16.

Aspect 35: A non-transitory computer-readable medium storing code for wireless communications at a UE, the code comprising instructions executable by a processor to perform a method of any of aspects 1 through 16.

Aspect 36: An apparatus for wireless communications at a base station, comprising a processor; memory coupled with the processor; and instructions stored in the memory and executable by the processor to cause the apparatus to perform a method of any of aspects 17 through 32.

Aspect 37: An apparatus for wireless communications at a base station, comprising at least one means for performing a method of any of aspects 17 through 32.

Aspect 38: A non-transitory computer-readable medium storing code for wireless communications at a base station, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a control message indicating a first radio bearer to be used for position sensing operations and a second radio bearer to be used for data communications;
    performing the position sensing operations in accordance with a resource allocation, the resource allocation based at least in part on the first radio bearer and the second radio bearer; and
    performing the data communications in accordance with the resource allocation, the resource allocation based at least in part on the first radio bearer and the second radio bearer.

2. The method of claim 1, further comprising:
    receiving, from a base station, an indication of the resource allocation based at least in part on the first radio bearer and the second radio bearer.

3. The method of claim 1, further comprising:
    identifying a start of an application, the position sensing operations associated with serving the application; and
    transmitting, to a base station, an indication of the start of the application, wherein receiving the control message indicating the first radio bearer and the second radio bearer is based at least in part on transmitting the indication of the start of the application.

4. The method of claim 3, wherein the application is associated with a sensing quality of service flow and the sensing quality of service flow is associated with the first radio bearer.

5. The method of claim 1, wherein the first radio bearer is a sensing radio bearer and is associated with a set of sensing quality of service flows, each sensing quality of service flow is associated with a quality of service indicator and a set of quality of service characteristics.

6. The method of claim 5, wherein each sensing quality of service flow is classified as a delay-critical guaranteed bit rate flow, a guaranteed bit rate flow, or a non-guaranteed bit rate flow.

7. The method of claim 1, wherein performing the position sensing operations and the data communications further comprises:
performing time division multiplexing in accordance with the resource allocation to perform the position sensing operations and the data communications in a same frequency band.

8. The method of claim 7, wherein the resource allocation allocates a first set of time resources to the first radio bearer, and allocates a second set of time resources to the second radio bearer, the first set of time resources and the second set of time resources associated with the same frequency band.

9. The method of claim 7, wherein performing the position sensing operations and the data communications further comprises:
performing the time division multiplexing of a first set of radio bearers for the position sensing operations and a second set of radio bearers for the data communications.

10. The method of claim 1, wherein the first radio bearer is associated with a first priority and the second radio bearer is associated with a second priority, the resource allocation based at least in part on the first priority and the second priority.

11. A method for wireless communications at a base station, comprising:
identifying a first radio bearer to be used for position sensing operations and a second radio bearer to be used for data communications; and
transmitting, to a user equipment (UE), a control message indicating the first radio bearer and the second radio bearer, the first radio bearer and the second radio bearer indicative of a resource allocation for the position sensing operations and the data communications.

12. The method of claim 11, further comprising:
transmitting, to the UE, an indication of the resource allocation based at least in part on the first radio bearer and the second radio bearer.

13. The method of claim 12, further comprising:
allocating a first set of time resources to the first radio bearer, and a second set of time resources to the second radio bearer, wherein the first set of time resources and the second set of time resources are associated with a same frequency band, the first set of time resources and the second set of time resources allocated in accordance with time division multiplexing.

14. The method of claim 13, further comprising:
allocating resources for a first set of radio bearers for the position sensing operations and resources for a second set of radio bearers for the data communications in accordance with the time division multiplexing.

15. The method of claim 11, further comprising:
comparing a first set of parameters associated with the position sensing operations and a second set of parameters associated with the data communications, wherein the resource allocation is based at least in part on the comparison.

16. The method of claim 11, further comprising:
receiving, from the UE, an indication of a start of an application by the UE, wherein transmitting the control message indicating the first radio bearer is based at least in part on receiving the indication of the start of the application.

17. The method of claim 16, further comprising:
identifying that the application is associated with a sensing quality of service flow; and
selecting the first radio bearer from a set of sensing radio bearers based at least in part on the sensing quality of service flow being associated with the first radio bearer, wherein the first radio bearer is a sensing radio bearer.

18. An apparatus for wireless communications at a user equipment (UE), comprising:
one or more processors;
one or more memories memory coupled with the one or more processors; and
instructions stored in the one or more memories memory and executable by the one or more processors to cause the apparatus to:
receive a control message indicating a first radio bearer to be used for position sensing operations and a second radio bearer to be used for data communications;
perform the position sensing operations in accordance with a resource allocation, the resource allocation based at least in part on the first radio bearer and the second radio bearer; and
perform the data communications in accordance with the resource allocation, the resource allocation based at least in part on the first radio bearer and the second radio bearer.

19. The apparatus of claim 18, wherein the instructions are further executable by the one or more processors to cause the apparatus to:
receive, from a base station, an indication of the resource allocation based at least in part on the first radio bearer and the second radio bearer.

20. The apparatus of claim 18, wherein the instructions are further executable by the one or more processors to cause the apparatus to:
identify a start of an application, the position sensing operations associated with serving the application; and
transmit, to a base station, an indication of the start of the application, wherein receiving the control message indicating the first radio bearer and the second radio bearer is based at least in part on transmitting the indication of the start of the application.

21. The apparatus of claim 20, wherein the application is associated with a sensing quality of service flow and the sensing quality of service flow is associated with the first radio bearer.

22. The apparatus of claim 18, wherein the first radio bearer is a sensing radio bearer and is associated with a set of sensing quality of service flows, each sensing quality of service flow is associated with a quality of service indicator and a set of quality of service characteristics.

23. The apparatus of claim 22, wherein each sensing quality of service flow is classified as a delay-critical guaranteed bit rate flow, a guaranteed bit rate flow, or a non-guaranteed bit rate flow.

24. The apparatus of claim 22, wherein the set of quality of service characteristics comprises one or more of a resource type, a priority level, a packet delay budget, or a set of example services.

25. The apparatus of claim 18, wherein the instructions to perform the position sensing operations and the data communications are further executable by the one or more processors to cause the apparatus to:
perform time division multiplexing in accordance with the resource allocation to perform the position sensing operations and the data communications in a same frequency band.

26. An apparatus for wireless communications at a base station, comprising:
one or more processors;
one or more memories memory coupled with the one or more processors; and
instructions stored in the one or more memories memory and executable by the one or more processors to cause the apparatus to:
identify a first radio bearer to be used for position sensing operations and a second radio bearer to be used for data communications; and
transmit, to a user equipment (UE), a control message indicating the first radio bearer and the second radio bearer, the first radio bearer and the second radio bearer indicative of a resource allocation for the position sensing operations and the data communications.

27. The apparatus of claim 26, wherein the instructions are further executable by the one or more processors to cause the apparatus to:
transmit, to the UE, an indication of the resource allocation based at least in part on the first radio bearer and the second radio bearer.

28. The apparatus of claim 27, wherein the instructions are further executable by the one or more processors to cause the apparatus to:
allocate a first set of time resources to the first radio bearer, and a second set of time resources to the second radio bearer, wherein the first set of time resources and the second set of time resources are associated with a same frequency band, the first set of time resources and the second set of time resources allocated in accordance with time division multiplexing.

29. The apparatus of claim 28, wherein the instructions are further executable by the one or more processors to cause the apparatus to:
allocate resources for a first set of radio bearers for the position sensing operations and resources for a second set of radio bearers for the data communications in accordance with the time division multiplexing.

30. The method of claim 1, wherein the position sensing operations comprise light detecting and ranging (LIDAR) sensing operations or radio detection and ranging (RADAR) sensing.

* * * * *